United States Patent
Villarreal et al.

(10) Patent No.: US 9,436,761 B2
(45) Date of Patent: Sep. 6, 2016

(54) DATA COMMUNICATIONS VIA LIMITED LENGTH AUDIO JACK

(71) Applicant: Apple Inc., Cupertino, CA (US)

(72) Inventors: Cesar Lozano Villarreal, Santa Clara, CA (US); Ruenjou Lu, Fremont, CA (US); Mahmoud R. Amini, Sunnyvale, CA (US); Jonathan M. Zweig, Cupertino, CA (US); David C. Breece, III, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 614 days.

(21) Appl. No.: 13/841,628

(22) Filed: Mar. 15, 2013

(65) Prior Publication Data

US 2014/0277643 A1    Sep. 18, 2014

(51) Int. Cl.

| G06F 17/00 | (2006.01) |
|---|---|
| G06F 17/30 | (2006.01) |
| H01R 24/58 | (2011.01) |
| H01R 24/86 | (2011.01) |
| H01R 107/00 | (2006.01) |

(52) U.S. Cl.
CPC ........... G06F 17/3074 (2013.01); H01R 24/58 (2013.01); H01R 24/86 (2013.01); *H01R 2107/00* (2013.01)

(58) Field of Classification Search
CPC .............. G06F 17/3074; H01R 24/58; H01R 2107/00; H01R 24/86
See application file for complete search history.

(56) References Cited

U.S. PATENT DOCUMENTS

| 8,290,171 B1* | 10/2012 | Helfrich | H04R 5/04 381/111 |
|---|---|---|---|
| 2011/0116750 A1* | 5/2011 | Terlizzi | G02B 6/3817 385/88 |
| 2012/0156901 A1* | 6/2012 | Ladouceur | H04M 1/0274 439/77 |
| 2012/0156907 A1* | 6/2012 | Ladouceur | H01R 13/639 439/131 |

* cited by examiner

*Primary Examiner* — Fan Tsang
*Assistant Examiner* — Eugene Zhao
(74) *Attorney, Agent, or Firm* — Kilpatrick Townsend & Stockton LLP

(57) ABSTRACT

Methods, systems, and apparatus for selectively communicating data and audio over a limited-size audio plug. A host device determines whether an audio accessory or a data communicating accessory is plugged therein via a signal, or lack thereof, communicated to the host device via the audio plug of the accessory. The host device then either communicates audio or data over the audio plug contacts that are typically used only for audio communication based on whether its connected to an audio accessory or data communicating accessory. An audio plug may also include a split-ring contact where multiple, independent contacts are formed in place of a single tip, ring, or sleeve contact. The split-ring contact may be used for communicating audio and/or data.

12 Claims, 14 Drawing Sheets

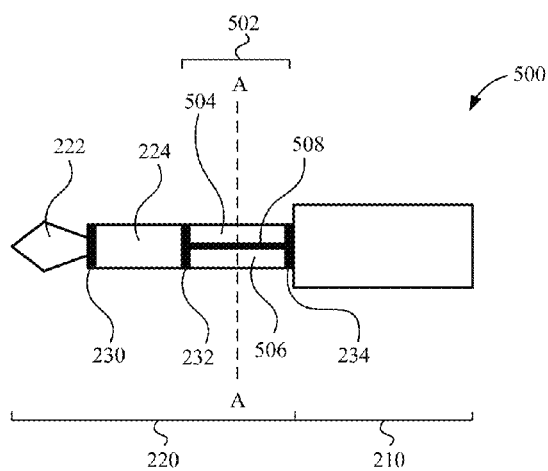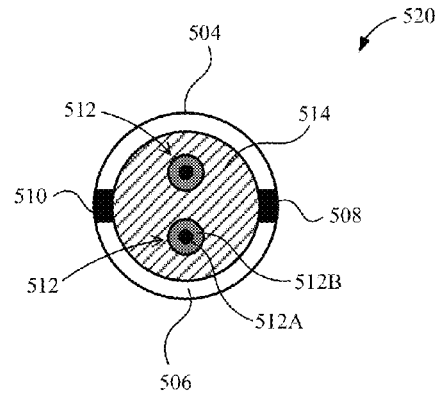
FIG. 5A FIG. 5B
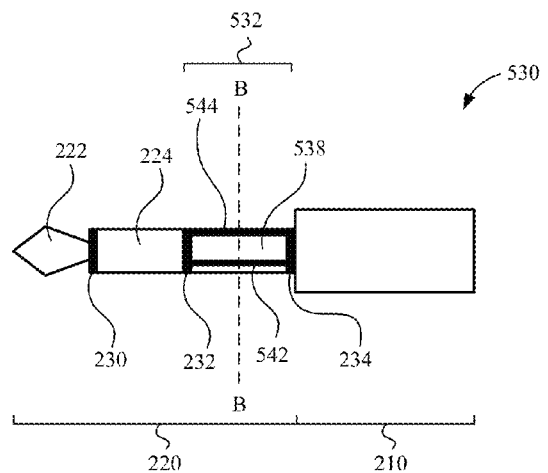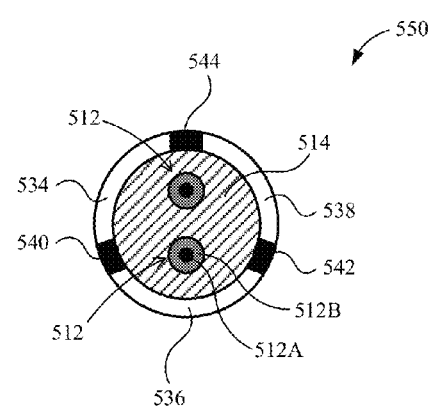
FIG. 6A FIG. 6B

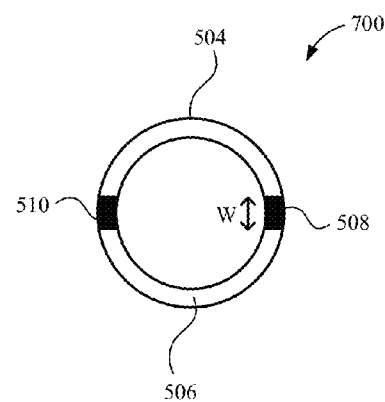
FIG. 12
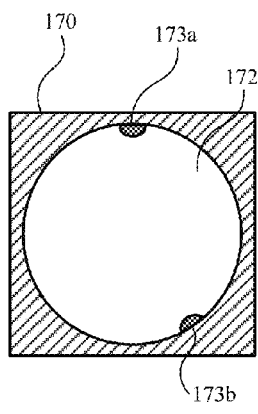 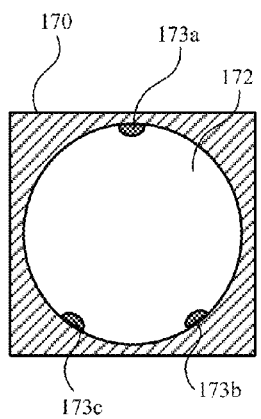 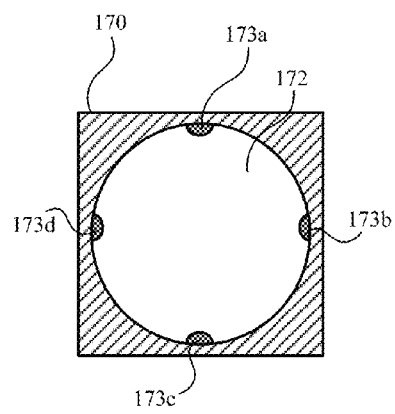
FIG. 13A  FIG. 13B  FIG. 13C

DATA COMMUNICATIONS VIA LIMITED LENGTH AUDIO JACK

BACKGROUND

Many electronic devices such as cellular phones, tablet computers, and the like have numerous input/output (I/O) interfaces that allow connectivity with other devices using one or more structural and communication protocol standards or, in some cases, proprietary standards. Such I/O interfaces make debugging the electronic devices by software engineers a fairly seamless task as the debugging tool can interface with the electronic devices using one or more of these common I/O interfaces, such RS-232, USB, etc.

Some electronic devices, however, have a limited number and type of I/O interfaces. A good example is portable audio players in which only an audio receptacle for receiving an audio plug (also known as an audio jack, stereo plug, mini-stereo headphone jack, microphone jack, etc.) may be provided. In these types of electronic devices debugging becomes much more challenging as the audio receptacle is typically designed to only carry audio signals (audio output from the device and, in some cases, microphone input). Debugging using a wireless communication technique is possible but also fraught with difficulties, including challenges arising from when the problems with the electronic devices arise from or interfere with the devices wireless communication circuitry, and challenges arising from wirelessly communicating with many devices arranged in close proximity to one another on an assembly line.

Some techniques for communicating data over an audio plug are known. These techniques typically call for data to be communicated from the electronic device via the audio output channels of the audio receptacle, and for data to be communicated to the electronic device via the microphone channel of the audio receptacle. That is, audio plugs include TS (tip-sleeve) connectors, TRS (tip-ring-sleeve) connectors, and TRRS (tip-ring-ring-sleeve) connectors, where 'tip' refers to an electrical contact being arranged at the tip of the audio plug, 'ring' refers to a ring contact being arranged next to the tip contact, and 'sleeve' refers to a contact being arranged at an end of the connector opposite the tip. For stereo audio, at least a TRS is generally required, as the tip and ring contacts are used for the left and right audio channels, respectively, and the sleeve contact is used as ground. To add a microphone channel, a TRRS connector is generally required, where the second ring contact is used for the microphone channel.

Accordingly, TRRS audio plugs may generally be used to communicate data via the microphone channel and one of the audio channels. However, there are continuing efforts to reduce the size of electronic devices, especially devices intended to be 'portable', and thus continuing efforts to reduce the size of the I/O interfaces included therewith. Since industry standards have evolved that effectively define the minimum lengths/spacing of tip, ring, and sleeve contacts of an audio plug, it may be extremely difficult and/or costly to incorporate a receptacle sized to receive a TRRS audio plug where the receptacle is both (a) compatible with the industry standards defined for the TRRS audio plug and (b) small enough to be effectively integrated into reduced size electronic devices. Thus, challenges arise when attempting to communicate data to and from an electronic device having a reduced-size audio plug receptacle as there is often insufficient space for the microphone contact that enables data to be communicated to the electronic device.

SUMMARY

Embodiments of the present invention are generally directed to host devices, accessories, and audio plugs. Some particular embodiments are directed to selectively communicating audio and data over a plug connector, communicating audio and/or data over a connector having a split-ring contact, and audio plugs including split-ring contacts.

In accordance with some of the methods described herein, an electronic device may be operable to selectively communicate audio and data over a plug connector to an accessory. This may be done by the electronic device detecting, at a receptacle connector of the electronic device including a plurality of receptacle contacts, insertion of a plug connector into the receptacle connector. The plug connector includes an insertion element coupled to a base, and the insertion element includes a plurality of plug contacts arranged linearly between the base and a tip of the insertion element. The plurality of plug contacts include a tip contact arranged at the tip of the insertion element, and a ring contact arranged between the tip contact and the base. The electronic device may then determine whether a signal is communicated to the electronic device via one or more of a first contact of the plurality of receptacle contacts and a second contact of the plurality of receptacle contacts. The first contact is arranged to electrically contact the tip contact of the plug connector upon insertion of the plug connector into the receptacle connector, and the second contact is arranged to electrically contact the ring contact upon insertion of the plug connector into the receptacle connector. The electronic device may then selectively communicate one of an audio signal or a data signal via at least one of the first contact or the second contact based on whether it is determined that a signal is communicated to the electronic device via one or more of the first contact and the second contact.

In accordance with other methods described herein, an electronic device may be operable to selectively communicate audio and data over a plug connector having a split-ring contact. This may be done by the electronic device detecting, at a receptacle connector of the electronic device including a plurality of receptacle contacts, insertion of a plug connector into the receptacle connector. The plug connector includes an insertion element coupled to a base, and the insertion element includes a plurality of plug contacts arranged linearly between the base and a tip of the insertion element. The plurality of plug contacts include a split-ring contact, where the split ring contact includes a plurality of contacts that partially circumscribe an axis extending linearly from the base to the tip of the insertion element. The contacts of the split ring are electrically insulated from one another. The electronic device then determines whether a signal is communicated to the electronic device via one or more of the plurality of receptacle contacts, and then selectively communicates one of an audio signal and a data signal via at least one of the plurality of receptacle contacts. Communicating the data signal includes communicating the data signal to at least one of the receptacle contacts that electrically contacts at least one of the plurality of contacts forming the split ring contact when the plug connector is fully inserted into the receptacle connector.

In addition to the methods of operating electronic devices described herein, embodiments are also directed to electronic devices. An electronic device according to one embodiment may include a plug connector including a base and an insertion element. The insertion element is coupled to and extends linearly from the base, and includes a plurality of plug contacts arranged linearly between the base and a tip of the insertion element. The plurality of plug contacts include a tip contact arranged at the tip of the insertion element, and a ring contact arranged between the tip contact and the base. The electronic device may also include communication circuitry coupled to the plug connector and operable to perform a variety of operations. For example, the communication circuitry may be operable to output a signal over at least one of the tip contact and the ring contact, determine whether a response to the signal is received over at least one of the tip contact and the ring contact, and establish data communication over the tip contact and the ring contact when it is determined that a response to the signal is received over at least one of the tip contact and the ring contact.

An electronic device according to another embodiment may include a plug connector including a base and an insertion element. The insertion element is coupled to and extends linearly from the base, and includes a plurality of plug contacts arranged linearly between the base and a tip of the insertion element. The plurality of plug contacts includes a split-ring contact. The split ring contact includes a plurality of contacts that partially circumscribe an axis extending linearly from the base to the tip of the insertion element, where the contacts of the split ring are electrically insulated from one another. The electronic device may also include communication circuitry coupled to the plug connector. The communication circuitry may be operable to perform a variety of operations. For example, the communication circuitry may be operable to output a signal over at least one of the plug contacts, determine whether a response to the signal is received, and establish data communication over at least one of the contacts forming the split ring contact when it is determined that a response to the signal is received over at least one of the tip contact and the ring contact.

In addition to the electronic devices and methods of operating electronic devices described herein, embodiments are also directed to audio plug connectors having one or more split-ring contacts. Specifically, at least one embodiment is directed to a plug connector including a base operable to support the plug connector for insertion into and removal from a receptacle connector. The plug connector may also include an insertion element extending linearly from the base. The insertion element includes a plurality of electrical contacts each extending linearly from the base. At least two of the electrical contacts have portions that are located at identical distances from the base, where the at least two electrical contacts are electrically isolated from one another. The plug connector may further include a plurality of conductive elements disposed within the insertion element. The conductive elements are electrically coupled to at least some of the electrical contacts of the insertion element so as to communicate signals between the electrical contacts and one or more electronic devices coupled to the plug connector.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

FIG. 5A illustrates a simplified split-ring plug connector according to a first embodiment.

FIG. 5B illustrates a cross-sectional view of the split ring connector of FIG. 5A through plane A-A.

FIG. 6A illustrates a simplified split-ring plug connector according to a second embodiment.

FIG. 6B illustrates a cross-sectional view of the split ring connector of FIG. 6A through plane B-B.

FIG. 12 illustrates a cross-sectional view of a split-ring plug connector similar to that described with reference to FIGS. 5A, 5B, and 8A through 8C, and includes a first contact arranged opposite a second contact whereby those contacts are electrically isolated from one another via insulation elements.

FIG. 13A illustrates a cross-sectional view of a receptacle having redundant receptacle contacts according to a first embodiment.

FIG. 13B illustrates a cross-sectional view of a receptacle having redundant receptacle contacts according to a second embodiment.

FIG. 13C illustrates a cross-sectional view of a receptacle having redundant receptacle contacts according to a third embodiment.

DETAILED DESCRIPTION

Various embodiments for communicating data and/or audio signals over an audio plug are described herein. In some situations it is desirable and/or necessary to incorporate receptacles in host devices (e.g., portable audio players) that have limited depths such that they may physically receive audio plugs of limited length. In some situations, this may be limited to receiving TRS audio plugs (or audio plug with fewer contacts than a TRS plug) as TRRS plugs sized to satisfy industry standards may include a contact that is too close to the exterior of the product (e.g., the sleeve contact) thereby causing undesirable aesthetics. To facilitate data communication over such audio plugs, data may be communicated over the tip and ring contacts, contacts which are typically designed for communicating audio. To distinguish between an audio accessory (e.g., headphones) and a data communication accessory (e.g., a debug tool), the host device may monitor a voltage on the tip and/or ring contacts. Typical audio accessories are passive devices and thus do not output a voltage via the audio plug; rather, they receive audio signals over the audio plug. In contrast, a data communication accessory may output a voltage on the tip and/or ring contact to indicate to the host device that a data communication accessory has been plugged in via the audio plug receptacle and wishes to engage in data communication with the host device. After detecting such a voltage, the host device may begin data communication with the accessory of the tip and/or ring contacts.

In other embodiments a split-ring audio plug and methods for using the same are disclosed. In a split-ring audio plug, a standard audio plug contact (e.g., a ring contact) is physically separated along its length into two or more contacts, where each contact is electrically isolated from one another. As a result, a split-ring audio plug is formed that has an increased number of electrical contacts compared to a similar sized traditional audio plug. The contacts of the split-ring audio plug may be used for data and/or audio communication. In one particular embodiment, one or more of the contacts forming the split-ring may be used for data communication, whereas the tip and ring contacts may be used for left and right channel audio communication. It should be recognized, however, that embodiments are not limited to such specific processes for using a split-ring audio plug contact.

Figure 1:
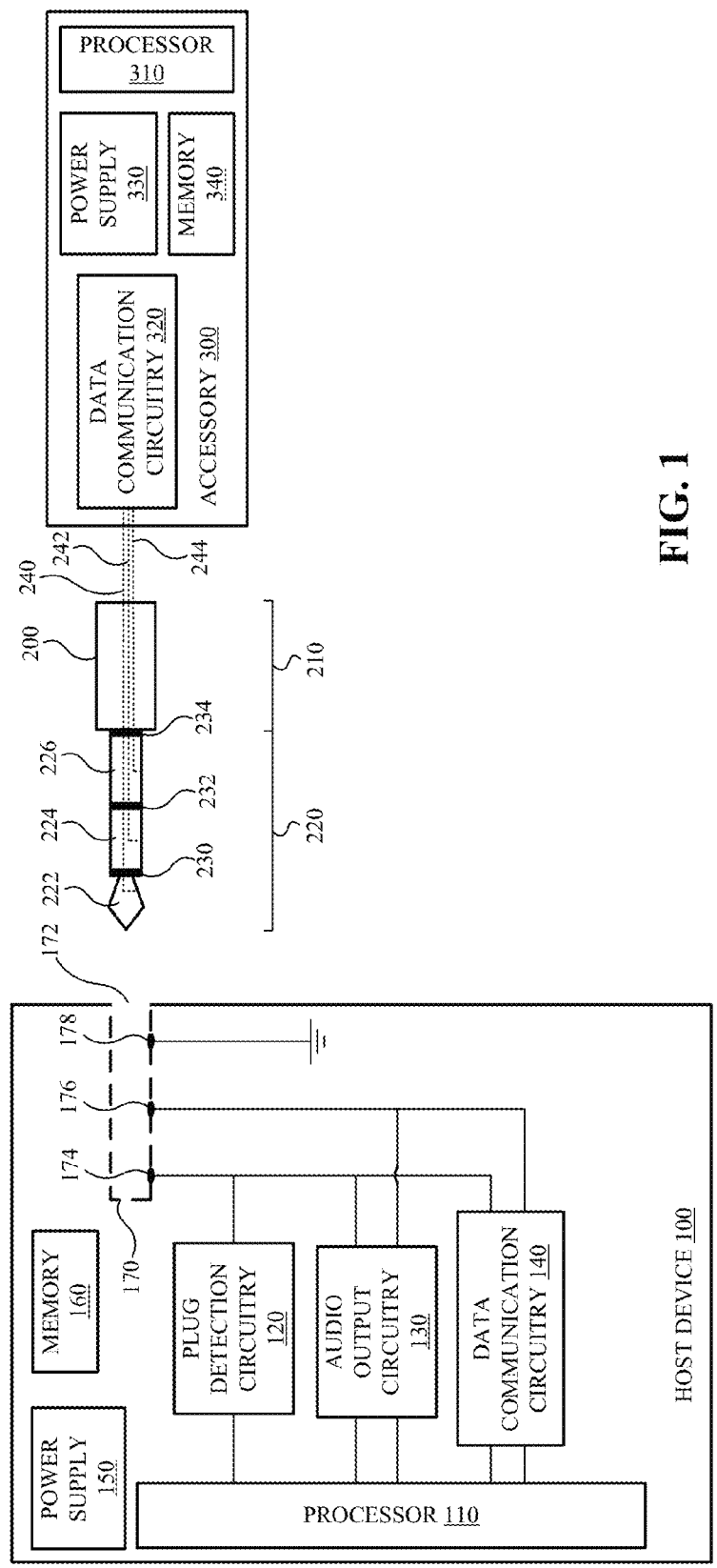
FIG. 1 illustrates a system for selectively establishing data communication or audio communication over an audio plug according to an embodiment.

Turning now to the figures, FIG. 1 illustrates a system for selectively establishing data communication or audio communication over an audio plug according to an embodiment. The system includes a host device 100, an audio plug 200, and an accessory 300, where the audio plug 200 may be part of or separate from the accessory 300.

Host device 100 may be any suitable electronic device that is operable to perform the functionality discussed herein, and may include one or more hardware and or software components operable to perform such functionality. For example, host device 100 may be a mobile phone, a personal digital assistant (PDA), a handheld or portable device (e.g., iPhone™, Blackberry™, etc.), a notebook, a personal computer, a note pad, a tablet computer, a media player (e.g., a music player or video player), a camera, a game player, a laptop computer, a netbook, a booklet, or other electronic device configured for wired and/or wireless communication. In one particular embodiment, host device 100 may be a portable media player.

Host device 100 includes a processor 110, plug detection circuitry 120, audio output circuitry 130, data communication circuitry 140, power supply 150, memory 160, and receptacle 170. Processor 110 may be any computer microprocessor operable to perform one or more of the functions described herein, such as an ARM microprocessor, and in one embodiment may be operable to execute one or more instructions stored on a tangible non-transitory storage element such as memory 160. Processor 110 may be communicatively coupled to other components of host device 100, such as plug detection circuitry 120, audio output circuitry 130, data communication circuitry 140, etc.

Plug detection circuitry 120 may be any hardware and/or software operable to detect the presence or absence of a plug inserted into receptacle 170, and in some embodiments may be operable to determine whether the plug is only partially or fully inserted into receptacle 170. Plug detection circuitry 120 in this embodiment is communicatively coupled to processor 110 and receptacle contact 174. In other embodiments, the functionality of plug detection circuitry 120 may be incorporated into other components of host device 100, such as processor 110, audio output circuitry 130, and/or data communication circuitry 140.

Audio output circuitry 130 may be any hardware and/or software operable to communicate one or more audio signals from the host device to another device (e.g., accessory 330) via one or more receptacle contacts. Audio output circuitry 130 in this embodiment is communicatively coupled to processor 110 and receptacle contacts 174 and 176. In one specific example, audio output circuitry 130 includes a left channel output communicatively coupled to receptacle contact 174 to output a left channel audio signal to receptacle contact 174, and a right channel output communicatively coupled to receptacle contact 176 to output a right channel audio signal to receptacle contact 176. It should be recognized, however, that these channel assignments are in no way intended to be limiting. Rather, in other embodiments, audio output circuitry 130 may be operable to output a right audio channel to receptacle contact 174 and a left audio channel to receptacle contact 176, and/or one or more of mono audio signals, reversed stereo signals (reversal of the left and right channels), unbalanced or balanced audio signals, etc. Further, it should be recognized that some or all of the functionality described herein with reference to audio output circuitry 130 may be incorporated into other components of host device 100, such as processor 110.

Data communication circuitry 140 may be any hardware and/or software operable to communicate one or more data signals between the host device and another device (e.g., accessory 300) via one or more receptacle contacts. This communication may be unidirectional (from host device 100 to accessory 300 or from accessory 300 to host device 100) or bidirectional. Data communication circuitry 140 in this embodiment is communicatively coupled to processor 110 and receptacle contacts 174 and 176. In other words, data communication circuitry 140 may be communicatively coupled to, and operable to receive data over, the same receptacle contacts used to output audio signals from the host device 100. It should be recognized that while in this embodiment data communication circuitry 140 is graphically depicted as being separate from other components of host device 100, in other embodiments some or all of the functionality described herein with reference to data communication circuitry 140 may be incorporated into other components of host device 100, such as processor 110.

Power supply 150 is any suitable power supply for providing operating power to one or more of the components of host device 100 and, in some embodiments, may provide power to accessory 300 over one or more of the receptacle contacts. Power supply 150 may include a battery, such as a rechargeable battery (lithium-ion, nickel metal hydride, nickel-zinc, nickel-cadmium, etc.), a non-rechargeable battery (alkaline, zinc-carbon, etc.), or other suitable type of battery. In some embodiments, power supply 150 may be coupled to an external power source, such as an AC power supply, that may be used to power host device 100 and/or recharge a battery included in host device 100.

Memory 160 is any suitable electronic storage element and may include a tangible, non-transient storage element. For example, memory 160 may be one or more of random access memory (RAM), read only memory (ROM), electrically-erasable programmable read only memory (EEPROM), a hard disk, an optical disk, etc. In one embodiment, memory 160 may store software code that may be executed by processor 110 so that host device 100 performs one or more of the functional operations described herein.

Receptacle 170 is a receptacle connector operable to physically receive audio plug 200. Receptacle 170 includes a cavity 172 sized and shaped to receive an insertion element 220 of audio plug 200. To do so, cavity 172 may extend linearly from a surface of a housing of the host device 100 in a direction internal to the host device 100. Cavity 172 may be cylindrical in shape and have a diameter sized to receive an audio plug such as a 2.5 mm plug, a 3.5 mm plug, a 6.3 mm plug, or other suitably sized audio plug. Accordingly, a diameter of cavity 172 may be slightly larger than the corresponding diameter of the audio plug the receptacle 170 is designed to receive.

Receptacle 170 includes a plurality of receptacle contacts for electrically contacting plug contacts on the audio plug 200. In this embodiment, receptacle 170 includes a first receptacle contact 174 arranged to contact a tip contact 222 of the audio plug 200, a second receptacle contact 176 arranged to contact ring contact 224 of the audio plug 200, and a third receptacle contact 178 arranged to contact a sleeve contact 226 of the audio plug 200, when the audio plug 200 is fully inserted into the receptacle 170. The receptacle contacts may be any suitable style of electrical contact, such as a spring contact that moves in a direction away from plug 200 when plug 200 is inserted into receptacle 170. It should be recognized that while in this embodiment the receptacle contacts are all provided on the same surface of receptacle 170 and are approximately equally spaced apart, in other embodiments they may be provided on different surfaces of receptacle 170 and have varied spacings therebetween. Moreover, while in this embodiment receptacle contacts 174 and 176 are electrically coupled to audio output circuitry 130 and data communication circuitry 140, and receptacle contact 178 is coupled to an electrical ground, in other embodiments, the receptacle contacts may be coupled to other components of host device 100 and/or held to voltage levels other than ground.

Audio plug 200 may be any suitable plug that is shaped and operable to perform the functionality described herein. For example, audio plug 200 may be a 2.5 mm plug, a 3.5 mm plug, a 6.3 mm plug, or other plug connector having the shape of a plug that is typically suited for audio communication. Audio plug 200 in this embodiment includes a base 210 and insertion element 220. Base 210 is operable to support the audio plug 200 for insertion of the insertion element 220 into and removal of the insertion element 220 from receptacle 170. Base 210 may also be physically coupled to insertion element 220 and, as illustrated in this embodiment, may be cylindrically shaped and have a diameter larger than a diameter of the cylindrically shaped insertion element 220. In other embodiments, base 210 may have a diameter less than or equal to the diameter of insertion element 220. Base 210 may be made of any suitable material, including an insulating material such as a plastic or polymer.

Insertion element 220 extends linearly from base 210 and includes a plurality of contacts and insulating elements that are configured to electrically insulate the contacts from one another. The contacts of insertion element 220 also extend linearly from base 210. In this particular embodiment, insertion element 220 includes a tip contact 222, a ring contact 224, and a sleeve contact 226. Tip contact 222 is electrically insulated from ring contact 224 by an insulation ring 230, and ring contact 224 is electrically insulated from sleeve contact 226 by insulation ring 232. The sleeve contact 226 is also optionally insulated from other components of plug 200 by insulation ring 234.

Audio plug 200 may also include one or more conductive elements disposed within the insertion element 220 for electrically coupling one or more components of accessory 300 to the plug contacts. For example, audio plug 200 may include a first conductive element 240 electrically coupled to tip contact 222, a second conductive element 242 electrically coupled to ring contact 224, and a third conductive element 244 electrically coupled to sleeve contact 226. The conductive elements may be, e.g., insulated wires or other conductive component configured to electrically contact one or more of the plug contacts. It should be recognized that one or more of these conductive elements may be optional. For example, in at least one embodiment, sleeve contact 226 may be electrically coupled to, e.g., a ground, of accessory 300 by way of electrical contact with an electrically conductive base 210, where the conductive base 210 may contact the ground of accessory 300. This may be applicable in a number of different embodiments, including ones where insulation ring 234 is partially or wholly absent from plug 200. It should be further recognized that the conductive elements may each be formed as a single element together with the respective contacts of the audio plug 200. For example, in embodiments where the audio plug 200 is formed from numerous conductive elements that are inserted molded, press-fit, or the like, conductive elements (e.g., first conductive element 240) may be formed as a single component together with the corresponding contact (e.g., tip contact 222).

Accessory 300 may be any suitable electronic device that is operable to perform the functionality discussed herein, and may include one or more hardware and or software components operable to perform such functionality. For example, accessory 300 may be a mobile phone, a personal digital assistant (PDA), a handheld or portable device (e.g., iPhone™, Blackberry™, etc.), a notebook, a personal computer, a note pad, a tablet computer, a media player (e.g., a music player or video player), a camera, a game player, a laptop computer, a netbook, a booklet, or other electronic device configured for wired and/or wireless communication. In one particular embodiment, accessory 300 is a debugging tool.

Accessory 300 includes a processor 310, data communication circuitry 320, power supply 330, and memory 340. Processor 310 may be any computer microprocessor operable to perform one or more of the functions described herein, such as an ARM microprocessor, and in one embodiment may be operable to execute one or more instructions stored on a tangible non-transitory storage element such as memory 340. Processor 310 may be communicatively coupled to other components of accessory 300, such as data communication circuitry 320, power supply 330, memory 340, etc.

Power supply 330 is any suitable power supply for providing operating power to one or more of the components of accessory 300 and, in some embodiments, may provide power to host device 100 over one or more of the receptacle contacts. Power supply 330 may include a battery, such as a rechargeable battery (lithium-ion, nickel metal hydride, nickel-zinc, nickel-cadmium, etc.), a non-rechargeable battery (alkaline, zinc-carbon, etc.), or other suitable type of battery. In some embodiments, power supply 330 may be coupled to an external power source, such as an AC power supply, that may be used to power accessory 300 and/or recharge a battery included in accessory 300.

Memory 340 is any suitable electronic storage element and may include a tangible, non-transient storage element. For example, memory 340 may be one or more of random access memory (RAM), read only memory (ROM), electrically-erasable programmable read only memory (EEPROM), a hard disk, an optical disk, etc. In one embodiment, memory 340 may store software code that may be executed by processor 310 so that accessory 300 performs one or more of the functional operations described herein.

The system described with reference to FIG. 1 in certain embodiments is a system for selectively establishing data communication or audio communication over an audio plug according to an embodiment, and includes a host device 100, audio plug 200, and accessory 300. However, it will be appreciated by those of ordinary skill in the art that such a system could operate equally well with more or, in some instances, fewer components than are illustrated in FIG. 1. Similarly, it will be appreciated by those of ordinary skill in the art that each of the host device 100, audio plug 200, and accessory 300 could operate equally well with more or, in some cases, fewer components, than those described with reference to FIG. 1. For example, the host device 100 and/or accessory 300 may also include I/O elements such as keyboards, mice, touchscreens, graphical displays, and other components of electronic devices known in the art. Thus, the depictions in FIG. 1 should be taken as being illustrative in nature, and not limiting to the scope of the disclosure.

Turning now to plug detection circuitry 120, audio output circuitry 130, and data communication circuitry 140, in various embodiments such circuitry may perform a variety of functions such as determining whether an audio plug is mated with an audio receptacle connector of the host device, determining whether the audio plug is associated with an audio accessory (e.g., headphones) or a data communication accessory (e.g., a debug tool), and then performing the appropriate audio or data communication. Plug detection circuitry 120 may include any suitable circuitry for detecting a physical mating of a plug connector with the receptacle connector of the host device 100, and thus may include mechanical switches, electrical contacts, optical sensors, and the like. Plug detection circuitry 120 is herein described as monitoring a voltage on receptacle contact 174, but embodiments are not so limited. Once the presence of an audio plug is detected, audio/data detection circuitry may then determine whether the audio plug is associated with an audio accessory or a data communication accessory. Such audio/data detection circuitry may monitor a voltage on some of the audio plug contacts, such as those contacts that are typically designated for receiving audio in audio accessories (i.e., tip and ring contacts). If no voltage is present, then the audio/data detection circuitry may determine that the audio plug is associated with an audio accessory and thereby enable audio communication with the accessory. However, if a voltage is present, then the audio/data detection circuitry may determine that the audio plug is associated with a data communication accessory and thereby enable data communication with the accessory. Audio/data detection circuitry is herein described as being incorporated in data communication circuitry 140, although embodiments are not so limited as such circuitry may be separate from data communication circuitry 140 or incorporated in other circuitry of the host device 100.

Figure 2A:
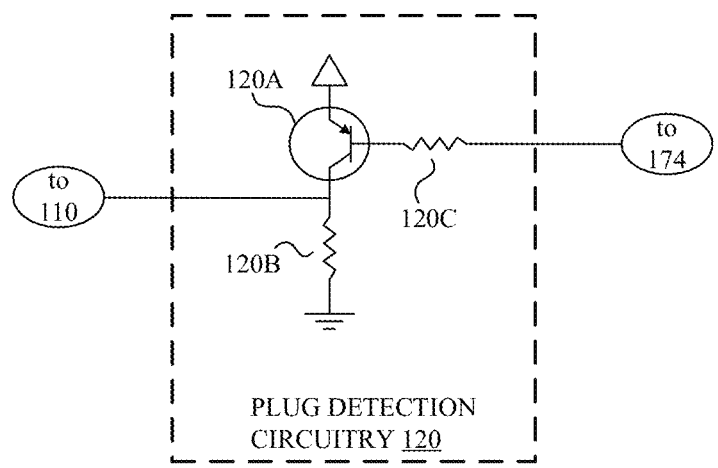
FIG. 2A is a schematic diagram of plug detection circuitry according to an embodiment.

Turning now to the figures, FIG. 2A is a schematic diagram of plug detection circuitry 120 according to an embodiment. Plug detection circuitry 120 according to this embodiment includes a transistor 120A and resistors 120B and 120C. Transistor 120A includes an emitter coupled to a positive voltage source, a base coupled to resistor 120C, and a collector coupled to resistor 120B and processor 110. Resistor 120B is coupled to the collector of transistor 120A on one end and ground on the other end. Resistor 120C is coupled to the base of transistor 120A on one end and receptacle contact 174 on the other end. In operation, processor 110 may detect voltage changes at the collector of transistor 120A indicative of whether a plug connector is disposed in the receptacle 170.

Figure 2B:
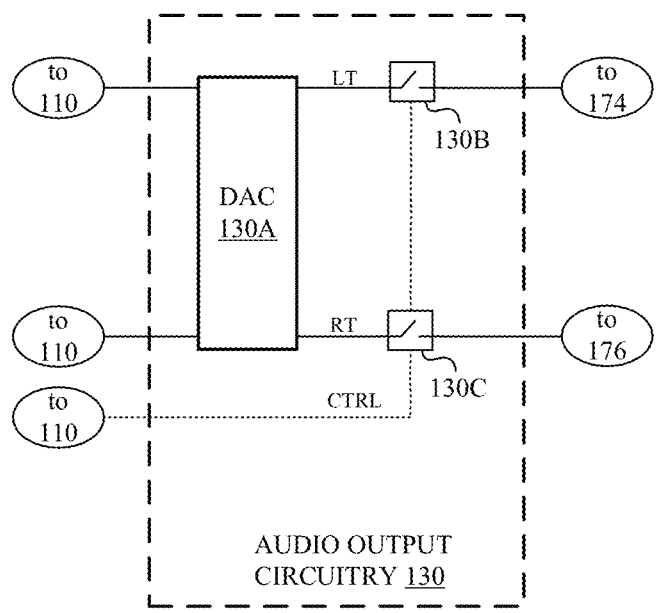
FIG. 2B is a schematic diagram of audio output circuitry according to an embodiment.

FIG. 2B is a schematic diagram of audio output circuitry 130 according to an embodiment. Audio output circuitry 130 includes a digital audio converter (DAC) 130A and switches 130B and 130C. DAC 130A operates to convert digital audio signals generated by host device 100 into audio signals that may be communicated to accessory 300 via receptacle 170. In this particular embodiment, switches 130B and 130C are arranged between DAC 130A and each of receptacle contact 174 and 176, respectively. When in a closed position, switches 130B and 130C electrically connect (i.e., reduce electrical isolation between) audio output circuitry 130 and receptacle connectors 174 and 176. When in an open position, switches 130B and 130C electrically disconnect (i.e., increase electrical isolation between) audio output circuitry 130 and receptacle connectors 174 and 176. Switches 130B and 130C may be coupled to processor 110 via a control line (CTRL) such that processor 110 may control the state (e.g., open or closed) of switches 130B and 130C. Further, processor 110 may be coupled to DAC 130A so as to communicate digital audio signals to DAC 130A. In one particular embodiment and as illustrated in FIG. 2B, audio output circuitry 130 may be operable to output a left audio channel to receptacle contact 174 and a right audio channel to receptacle contact 176. However, in other embodiments audio output circuitry 130 may output different audio channels and/or signals to the receptacle contacts.

Figure 2C:
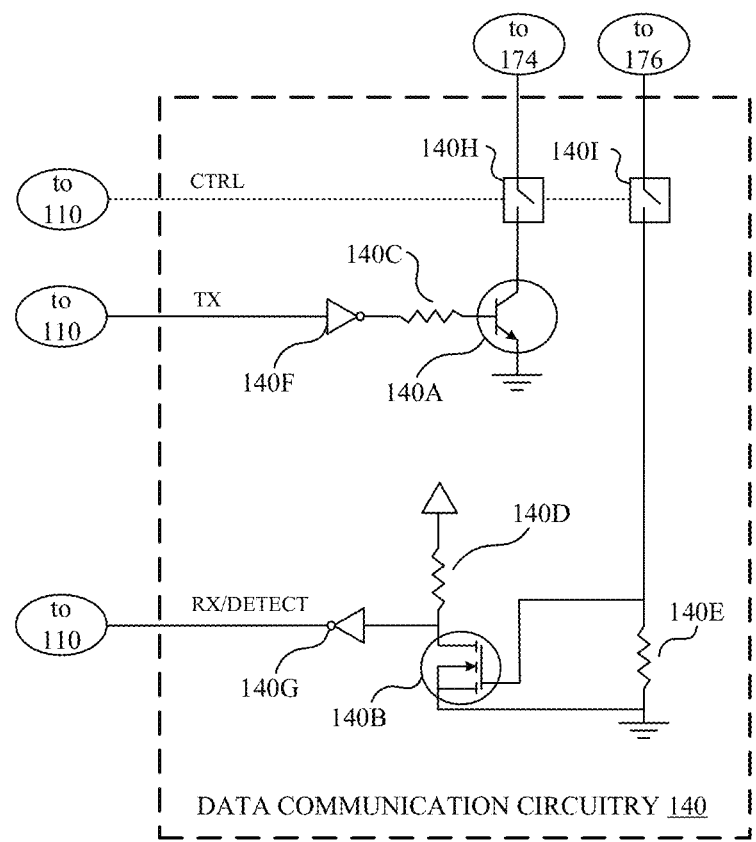
FIG. 2C is a schematic diagram of data communication circuitry according to an embodiment.

FIG. 2C is a schematic diagram of data communication circuitry 140 according to an embodiment. Data communication circuitry 140 includes a first transistor 140A (e.g., a BJT), a second transistor 140B (e.g., an IGFET), resistors 140C, 140D, and 140E, inverters 140F and 140G, and switches 140H and 140I. Transistor 140A includes an emitter coupled to ground, a base coupled to resistor 140C, and a collector coupled to switch 140H. Switch 140H is also coupled to receptacle contact 174. Resistor 140C is coupled between the base of transistor 140A and inverter 140F. The other side of inverter 140F is coupled to processor 110 to receive a data signal from processor 110. Transistor 140A and its associated circuitry are operable to communicate data from processor 110 to receptacle contact 174.

Transistor 140B includes a source coupled to resistor 140E and ground, a gate coupled to the other side of resistor 140E and switch 140I, and a drain coupled to resistor 140D and inverter 140G. Resistor 140E is coupled between ground and switch 140I, and switch 140I is also coupled to receptacle contact 176. Resistor 140D is coupled to the drain of transistor 140B and inverter 140G on one end, and to a positive voltage source on the other end. The other end of inverter 140G is coupled to processor 110 to send a data signal to processor 110.

Transistor 140B and its associated circuitry are operable to detect a signal, e.g., a positive voltage, at receptacle contact 176, and receive data over receptacle contact 176. That is, when a positive voltage (with reference to the electrical ground) is provided to receptacle contact 176, RX/DETECT is pulled high. This may be the case when a debug tool or other electronic device desires to communicate data with electronic device 100 over receptacle contacts 174 and 176 that are typically used only to output audio from electronic device 100. When a positive voltage is detected at receptacle contact 176, electronic device 100 may then recognize that a debug tool or other electronic device desires to communicate data with electronic device 100 over the audio contacts, and thus electronic device may begin communicating data via receptacle contacts 174 and 176. For example, electronic device 100 may send data via the TX line coupled to receptacle contact 174 and receive data via the RX/DETECT line coupled to receptacle contact 176. It should be recognized that in some embodiments the TX and RX_DETECT circuitry may be switched so that electronic device 100 can detect and receive data signals over receptacle contact 174 and send data signals over receptacle contact 176. Further, when there is no voltage detected at receptacle contact 176, electronic device 100 may determine that a standard audio accessory has been connected thereto, and thus may send audio to the audio accessory using audio output circuitry 130.

Switches 140H and 140I, when in a closed position, electrically connect (i.e., reduce electrical isolation between) data communication circuitry 140 and receptacle connectors 174 and 176. When in an open position, switches 140H and 140I electrically disconnect (i.e., increase electrical isolation between) data communication circuitry 140 and receptacle connectors 174 and 176. Switches 140H and 140I may be coupled to processor 110 via a control line (CTRL) such that processor 110 may control the state (e.g., open or closed) of switches 140H and 140I.

Plug detection circuitry 120, audio output circuitry 130, and data communication circuitry 140 in certain embodiments include a variety of components as illustrated in and described with reference to FIGS. 2A through 2C. However, it will be appreciated by those of ordinary skill in the art that such circuitry could operate equally well with more or, in some instances, fewer components than are illustrated in FIGS. 2A through 2C. Thus, the depictions in FIGS. 2A through 2C should be taken as being illustrative in nature, and not limiting to the scope of the disclosure.

Some or all of the components described with reference to FIGS. 1 through 2C may be used to perform a process for selectively establishing data communication or audio communication over an audio plug. As described, in some embodiments the host device may detect engagement of an audio plug with a receptacle connector of the host device and subsequently determine whether the audio plug is associated with an audio accessory or data communication accessory.

In some embodiments, the host device may be placed in a default state where it presumes a data communication accessory will be plugged in. In such a case, the host device may isolate audio output circuitry from the receptacle contacts so as to reduce interference, and may electrically connect data communication circuitry to the receptacle contacts to facilitate the presumed data communication. After an audio plug has been inserted into the host device, if the audio plug is indeed associated with a data communication device, then the host device may simply begin communicating data with the data communication device. However, if the audio plug is actually associated with an audio device, then the host device may disconnect the data communication circuitry from the receptacle contacts (so as to reduce interference) and connect the audio output circuitry to the receptacle contacts (so as to facilitate audio communication).

The process described with reference to FIG. 3 includes operations similar to those described above, where it is presumed that the audio plug is associated with a data communication device. However, in other embodiments, the opposite may be true. That is, the host device may presume that the audio plug is associated with an audio device. In such a case, the audio output circuitry may initially be coupled to the receptacle contacts whereas the data communication circuitry may initially be isolated from those contacts. In other embodiments, there may be no presumptions, in which case both of the audio output circuitry and data communication circuitry may be isolated from the receptacle contacts and subsequently coupled thereto only after determining whether the audio plug is associated with an audio device or data communications device. One skilled in the art would recognize numerous variations.

Figure 3:
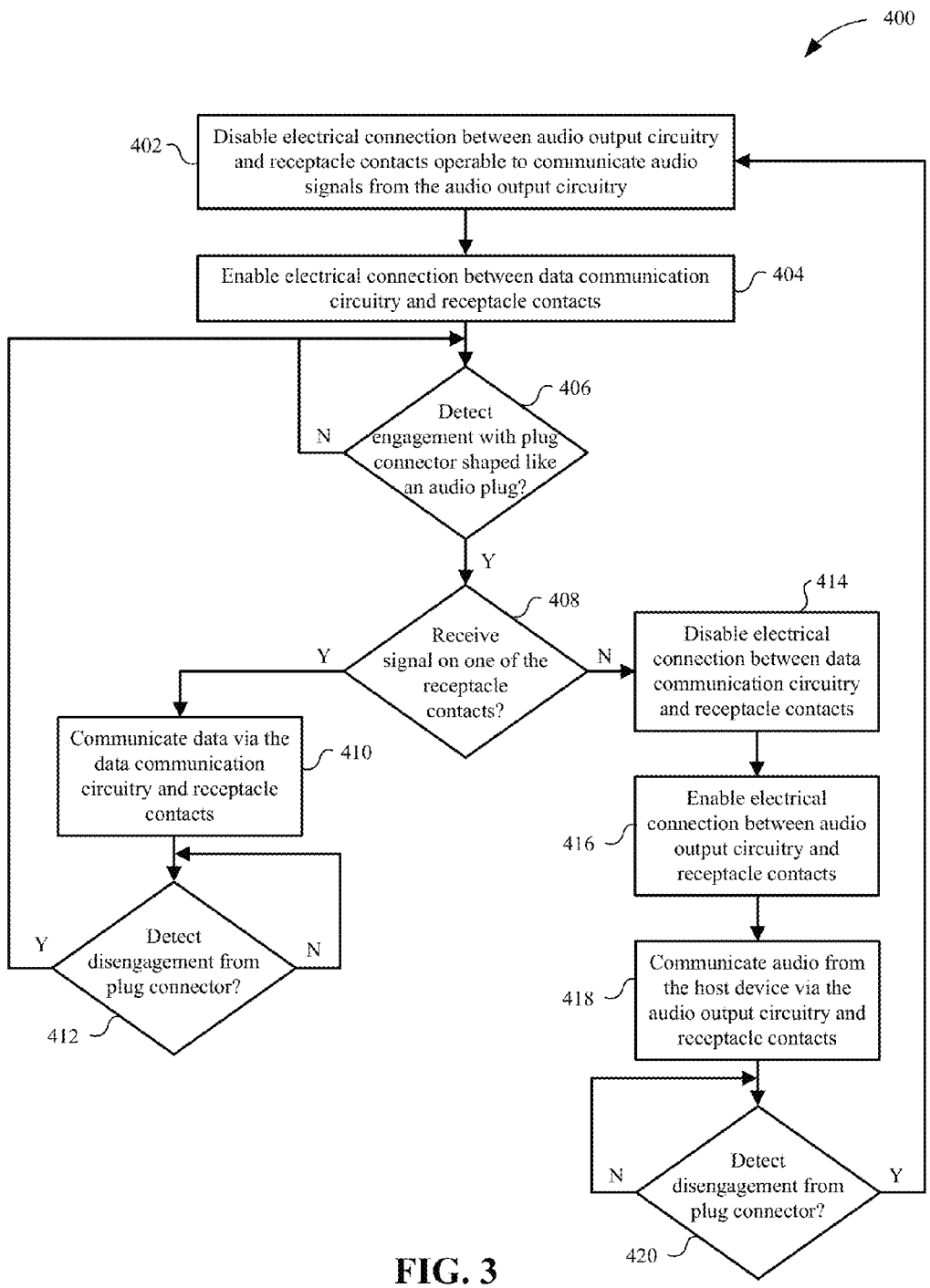
FIG. 3 illustrates a process of a host device for selectively establishing data communication or audio communication over an audio plug according to an embodiment.

Turning now to the figures, FIG. 3 illustrates a process 400 of a host device for selectively establishing data communication or audio communication over an audio plug according to an embodiment. While described with reference to FIGS. 1 through 2C, it should be recognized that embodiments are not so limited.

In operation 402, an electrical connection between audio output circuitry (e.g., audio output circuitry 130) and receptacle contacts operable to communicate audio signals from the audio output circuitry (e.g., receptacle contacts 174 and 176) is disabled. For example, processor 110 may control switches 130B and 130C to operate in an open state, thereby disabling the electrical connection (i.e., increasing the electrical impedance) between audio output circuitry 130 and receptacle contacts 174 and 176.

In operation 404, an electrical connection between data communication circuitry (e.g., data communication circuitry 140) and the receptacle contacts (e.g., receptacle contacts 174 and 176) is enabled. For example, processor 110 may control switches 140H and 140I to operate in a closed state, thereby enabling the electrical connection (i.e., decreasing the electrical impedance) between data communication circuitry 140 and receptacle contacts 174 and 176.

In operation 406, it is determined whether engagement with a plug connector shaped like an audio plug is detected. For example, processor 110 may monitor a voltage between transistor 120A and resistor 120B of plug detection circuitry 120 and, when a voltage is detected, determine that a plug connector shaped like an audio plug has been fully inserted into receptacle 170. If it is determined that a plug connector has not yet been fully engaged with the receptacle connector, then processing may return to operation 406 where host device 100 continues to monitor for such an engagement. Otherwise, processing may continue to operation 408.

In operation 408 it is determined whether a signal is received on one of the receptacle contacts that is operable to communicate audio signals from the audio output circuitry. For example, processor 110 may monitor a voltage output from inverter 140G. When a positive voltage is supplied to receptacle connector 176, the voltage output from inverter 140G will change from a low state to a high state. When the processor 110 identifies a high voltage output by inverter 140G, it determines that a signal is received on one of the receptacle contacts 174 and 176. In other embodiments, processor 110 may need to receive a particular string of bits or data to determine that a signal is received on one of the receptacle contacts. When it is determined that a signal is received on one of the receptacle contacts, this is indicative of an accessory being coupled to host device where the accessory desires to engage in data communication. Accordingly, processing may continue to operation 410.

In operation 410, data is communicated via the data communication circuitry (e.g., data communication circuitry 140) and the receptacle contacts that are also operable to communicate audio from the audio output circuitry (e.g., receptacle contacts 174 and 176). For example, data may be transmitted from host device 100 to accessory 300 via transistor 140A and receptacle contact 174, and data may be received from accessory 300 by host device 100 via transistor 140B and receptacle contact 176. In one particular embodiment, data communicated via the receptacle contacts may include handshake data suitable for establishing communication between host device 100 and accessory 300 in accordance with a particular data communication protocol.

Processing may then continue to operation 412 where it is determined whether a disengagement from the plug connector is detected. For example, processor 110 may detect a change in voltage between transistor 120A and resistor 120B indicative of the audio plug being removed from the receptacle connector. When it is determined that the audio plug has not been removed from the receptacle connector, processing may return to operation 412 where the host device 100 continues to monitor for removal of the audio plug (in some cases, simultaneously with communicating data). Otherwise, processing may return to operation 406 where the host device 100 monitors for re-engagement with the audio plug.

Returning to operation 408, when it is determined that a signal is not received on one of the receptacle contacts that is operable to communicate audio signals from the audio output circuitry (e.g., for a certain period of time after detecting engagement with the plug connector), this is indicative of an accessory being coupled to a host device where the accessory desires to engage in audio communication. Accordingly, processing may continue to operation 414.

In operation 414 the electrical connection between data communication circuitry (e.g., data communication circuitry 140) and the receptacle contacts (e.g., receptacle contacts 174 and 176) is disabled. For example, processor 110 may control switches 140H and 140I to operate in an open state, thereby disabling the electrical connection (i.e., increasing the electrical impedance) between data communication circuitry 140 and receptacle contacts 174 and 176.

In operation 416, the electrical connection between audio output circuitry (e.g., audio output circuitry 130) and receptacle contacts operable to communicate audio signals from the audio output circuitry (e.g., receptacle contacts 174 and 176) is enabled. For example, processor 110 may control switches 130B and 130C to operate in a closed state, thereby enabling the electrical connection (i.e., reducing the electrical impedance) between audio output circuitry 130 and receptacle contacts 174 and 176.

In operation 418, audio is communicated from the host device to the accessory via audio output circuitry (e.g., audio output circuitry 130) and the receptacle contacts (e.g., receptacle contacts 174 and 176). For example, a digital audio signal may be output by processor 110 to audio output circuitry 130, DAC 130A may convert the digital audio signal into an analog waveform, and the analog waveform may be transmitted to accessory 300 via receptacle contacts 174 and 176. In one particular embodiment, a left stereo channel may be transmitted via receptacle contact 174 and a right stereo channel may be transmitted via receptacle contact 176.

Processing may then continue to operation 420 where it is determined whether a disengagement from the plug connector is detected. For example, processor 110 may detect a change in voltage between transistor 120A and resistor 120B indicative of the audio plug being removed from the receptacle connector. When it is determined that the audio plug has not been removed from the receptacle connector, processing may return to operation 420 where the host device 100 continues to monitor for removal of the audio plug (in some cases, simultaneous with communicating audio). Otherwise, processing may return to operation 402 where the host device 100 disables the electrical connection between the audio output circuitry and receptacle contacts and re-enables the electrical connection between the data communication circuitry and receptacle contacts.

It should be appreciated that the specific operations illustrated in FIG. 3 provide a particular process of a host device for selectively establishing data communication or audio communication over an audio plug according to an embodiment. The various operations described with reference to FIG. 3 may be implemented at and performed by one or more of a variety of electronic devices or components described herein, such as host device 100. Other sequences of operations may also be performed according to alternative embodiments. For example, alternative embodiments of the present invention may perform the operations outlined above in a different order. Moreover, the individual operations illustrated in FIG. 3 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

In addition to processes for a host device determining whether to engage in audio or data communication being disclosed, some embodiments are also directed to processes for operating an accessory (e.g., a debug tool) to communicate data over contacts of an audio plug that are typically used for audio communication. In such embodiments, the accessory first indicates to the host device that it is an accessory desiring to communicate data over such contacts. In the embodiments described herein, the accessory does this by setting a voltage of one of those contacts (e.g., the tip contact or ring contact of an audio plug) high or by sending some particular string of data over one or more of those contacts. If the accessory receives a response comprising some data communication, then the accessory may determine that the host device has properly identified the accessory as being a data communication accessory. However, if the accessory does not receive such a response, then the accessory may determine that the host has not yet recognized the accessory as being a data communication accessory and thus may not be in a state suitable for data communications. Accordingly, the accessory may again attempt to notify the host device that it is an accessory operable to engage in data communication and may continue to do so until it receives a suitable response from the host device.

Figure 4:
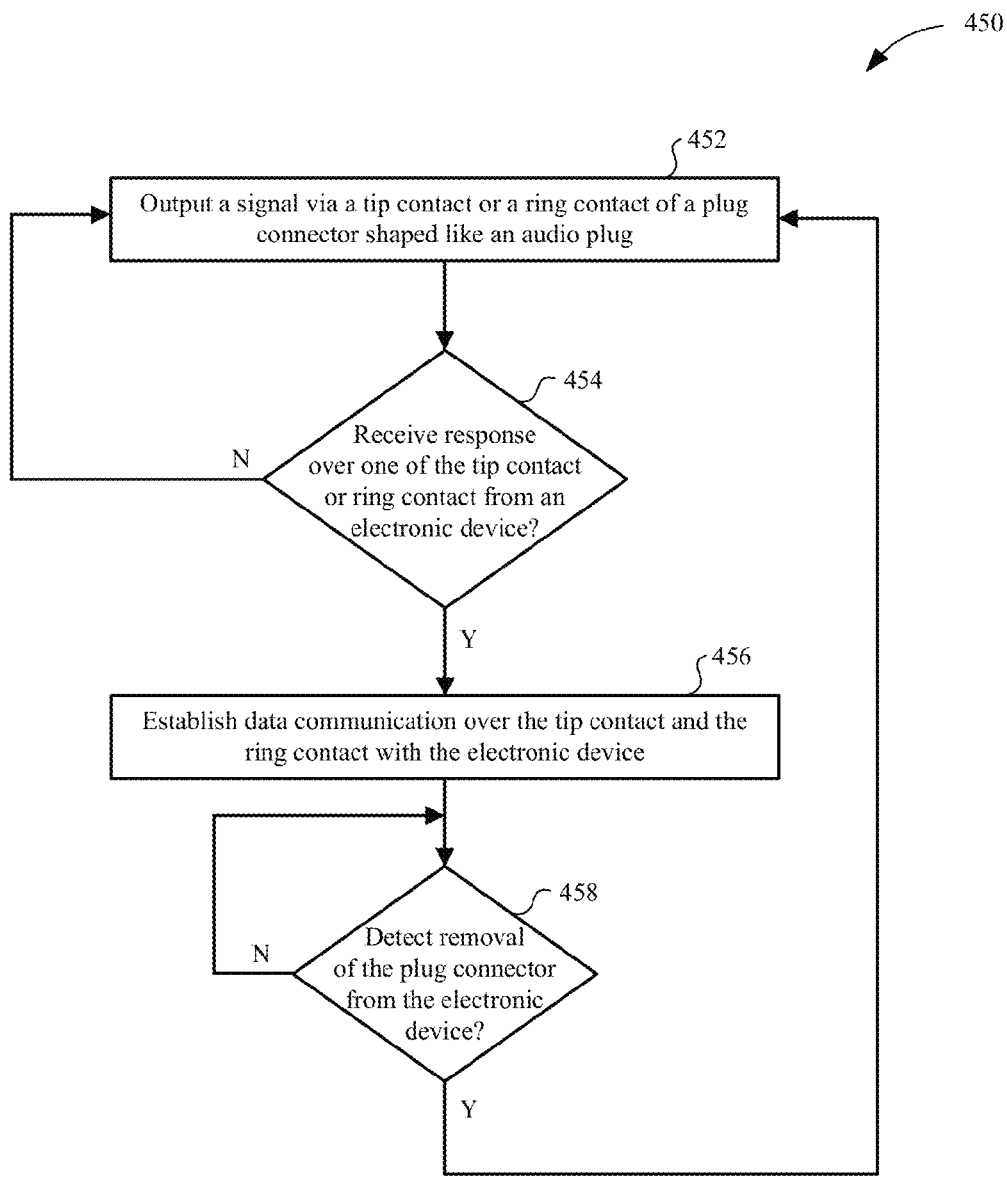
FIG. 4 illustrates a process of an accessory for establishing data communication over an audio plug according to an embodiment.

Turning to the figures, FIG. 4 illustrates a process 450 of an accessory for establishing data communication over an audio plug according to an embodiment. While described with reference to FIGS. 1 through 3, it should be recognized that embodiments are not so limited.

In operation 452 a signal is output via a tip contact or a ring contact of a plug connector shaped like an audio plug. For example, data communication circuitry 320 may output a voltage or other signal (such as a sequence of bits) to ring contact 224 of audio plug 200 via the conductive element 242. Such signal may be generated and communicated by accessory 300 to indicate to host device 100 that accessory 300 desires to engage in data communication via the audio plug 200.

In operation 454 it is determined whether a response is received over one of the tip contact or the ring contact from the electronic device. For example, data communication circuitry 320 may monitor tip contact 222 to determine whether any voltage or other signal (e.g., a handshake signal) is received at the tip contact 222. If it is determined that a response is not received within a particular time period, then processing may return to operation 452 where the accessory again (or continues to) output a signal via the tip contact or ring contact. Otherwise, processing may continue to operation 456.

In operation 456 data communication is established over the tip contact and the ring contact with the electronic device. For example, data communication circuitry 320 may communicate data to host device 100 via ring contact 224 and conductive element 242, where such data is received by transistor 140B via receptacle contact 176 of host device 100. Data communication circuitry 320 may receive data from host device 100 via tip contact 222 and conductive element 240, where such data is communicated by transistor 140A via receptacle contact 174 of host device 100.

In operation 458 accessory 300 may determine whether removal of the plug connector (e.g., audio plug 200) from the electronic device (e.g., receptacle 170 of host device 100) has been detected. For example, data communication circuitry 320 may monitor the communications between accessory 300 and host device 100 and, if data is lost for a certain period of time, determine that audio plug 200 has been removed from receptacle 170. For another example, accessory 300 may include plug detection circuitry (similar to that described with reference to host device 100) operable to determine whether audio plug 200 is fully inserted into receptacle 170. When it is determined that the audio plug has not been removed from the receptacle connector, processing may return to operation 458 where the accessory 300 continues to monitor for removal of the audio plug (in some cases, simultaneously with performing data communication). Otherwise, processing may return to operation 452 where the accessory again outputs a signal via the tip contact or ring contact of the audio plug.

It should be appreciated that the specific operations illustrated in FIG. 4 provide a particular process of an accessory for establishing data communication over an audio plug according to an embodiment. The various operations described with reference to FIG. 4 may be implemented at and performed by one or more of a variety of electronic devices or components described herein, such as accessory 300. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

While one technique for facilitating data communication with over a limited sized audio plug connector (e.g., a TRS audio plug) includes communicating data over contacts typically reserved for audio communication, in other techniques such data communication may be facilitated by increasing the number of available plug contacts within a similarly spaced audio plug. This may be done, for example, by splitting the contacts of the audio plug (e.g., a TRS audio plug) into multiple contacts. For example, the tip contact, ring contact, and/or the sleeve contact may each be split into multiple independent contacts. Various embodiments for such splitting and uses thereof are further described herein.

Turning now to FIGS. 5A through 7B, these figures illustrate simplified split-ring plug connectors according to various embodiments. Specifically, FIG. 5A illustrates a side view of a simplified split-ring plug connector 500 according to a first embodiment, and FIG. 5B illustrates a cross-sectional view 520 of the split-ring plug connector 500 of FIG. 5A through plane A-A. The split-ring plug connector according to this embodiment is similar to the audio plug 200 described with reference to FIG. 1 at least with respect to elements that are identically labeled, thus further description of such elements is omitted. However, in contrast to the audio plug 200 of FIG. 1, which includes a sleeve contact 226, the split-ring plug connector according to this embodiment includes a split-ring contact 502 arranged between insulation rings 232 and 234. The split-ring contact 502 includes a first contact 504 and a second contact 506 that are electrically isolated from one another by insulation elements 508 and 510.

In this particular embodiment, contacts 504 and 506 are arranged opposite one another with respect to a plane extending linearly from the base 210 to the tip of the insertion element 220. The insulation elements 508 and 510 similarly extend linearly from the base 210 toward the tip of insertion element 220 and along the insertion element 210. The insulation elements 508 and 510 also extend perpendicular to the insulation rings (although in other embodiments they may be angled with respect to the insulation rings). In this particular embodiment, the contacts 504 and 506 extend the same length from base 210. However, in other embodiments, contacts 504 and 506 may have different lengths and/or may be offset with respect to one another along the axis extending linearly from the base 210 to the tip of the insertion element 220.

With reference to the cross-sectional view 520 of the split-ring connector plug, the contacts 504 and 506 are cylindrically shaped such that they only partially circumscribe the axis extending linearly from the base 210 to the tip of the insertion element 220. This is in contrast to other contacts of the split-ring connector plug, such as ring contact 224, which is cylindrically shaped and fully circumscribes that axis. In this particular embodiment, the split-ring connector plug includes wires 512 formed of a conductive element 512A surrounded by an insulative sheath 512B. The wires 512 are supported in the split-ring connector plug by insulation material 514 which may be any suitable dielectric material with insulating properties. Such wires 512 may be electrically coupled to various contacts of the split-ring plug connector, and may extend out of the split-ring plug connector for electrical connection with accessory 300.

FIG. 6A illustrates a side view of a simplified split-ring plug connector 530 according to a second embodiment, and FIG. 6B illustrates a cross-sectional view 550 of the split-ring plug connector 530 through plane B-B. The split-ring plug connector according to this embodiment is similar to that described with reference to FIG. 5A and FIG. 5B at least with respect to elements that are identically labeled, thus further description of such elements is omitted. However, in contrast to the split-ring plug connector of FIG. 5A and FIG. 5B, which includes a split-ring contact 502 including two contacts 504 and 506, the split-ring contact 532 in this embodiment includes three contacts 534, 536, and 538. The first contact 534 is electrically insulated from the second contact 536 by insulation element 540, the second contact 536 is electrically insulated from the third contact 538 by insulation element 542, and the third contact 538 is electrically insulated from the first contact 534 by insulation element 544.

Figure 7A:
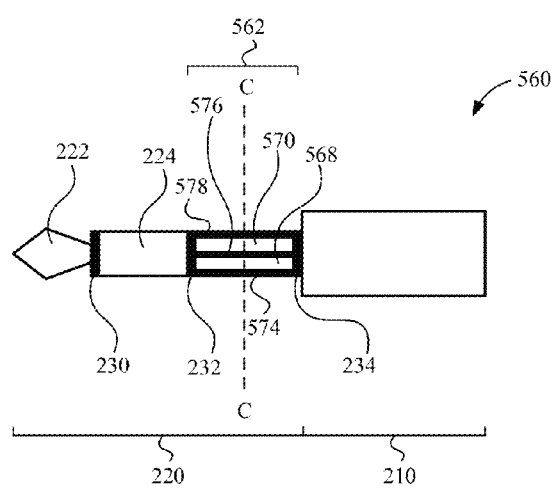
FIG. 7A illustrates a simplified split-ring plug connector according to a third embodiment.
Figure 7B:
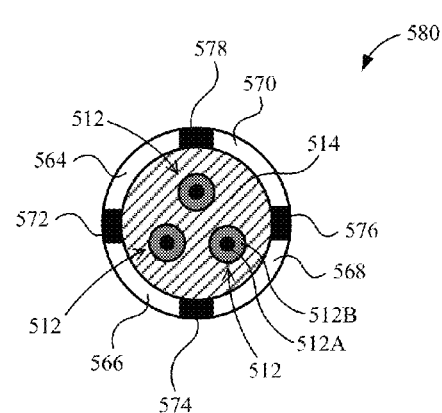
FIG. 7B illustrates a cross-sectional view of the split ring connector of FIG. 7A through plane C-C.

FIG. 7A illustrates a side view of a simplified split-ring plug connector 560 according to a third embodiment, and FIG. 7B illustrates a cross-sectional view 580 of the split-ring plug connector 560 through plane C-C. The split-ring plug connector according to this embodiment is similar to that described with reference to FIG. 5A and FIG. 5B at least with respect to elements that are identically labeled, thus further description of such elements is omitted. However, in contrast to the split-ring plug connector of FIG. 5A and FIG. 5B, which includes a split-ring contact 502 including two contacts 504 and 506, the split-ring contact 562 in this embodiment includes four contacts 564, 566, 568, and 570. The first contact 564 is electrically insulated from the second contact 566 by insulation element 572, the second contact 566 is electrically insulated from the third contact 568 by insulation element 574, the third contact 568 is electrically insulated from the fourth contact 570 by insulation element 576, and the fourth contact 570 is electrically insulated from the first contact 564 by insulation element 578.

It should be recognized that the split-ring plug connectors described with reference to FIGS. 5A through 7B are merely examples and not intended to limit the scope of the embodiments described herein. For example, in some embodiments, the split ring contact may be arranged at different portions of the insertion element, such as at ring contact 224. In some embodiments, there may no sleeve contact, but rather only a tip contact and split-ring contact. In some embodiments, there may be two, three, or more ring contacts, any of which may be split-ring contacts. In some embodiments, more than one of the contacts (e.g., two of the ring contacts) may be split-ring contacts. Further, in some embodiments the contacts forming a split-ring contact may not have the same length or width. For example, with respect to length, the contacts forming a split-ring contact may extend to the same or different lengths from the base 210. With respect to width and with reference to cross-sectional view 520, contact 504 may circumscribe the aforementioned axis more or less (e.g., forming 60 degrees of the circumference of the plug) than that of contact 506 (e.g., forming 280 degrees, where the remaining 20 degrees are formed by insulation elements 508 and 510). Further yet, in at least one embodiment, one or more of the contacts forming a split-ring contact may not be conductive but rather may be insulative. For example, with reference to FIG. 5A, contact 504 may be an electrical insulator rather than an electrical conductor, and in one embodiment may form a single insulative component together with other insulation elements such as insulation elements 508 and 510. One of ordinary skill in the art would recognize and appreciate many variations, modifications, and alternatives.

Figure 8A:
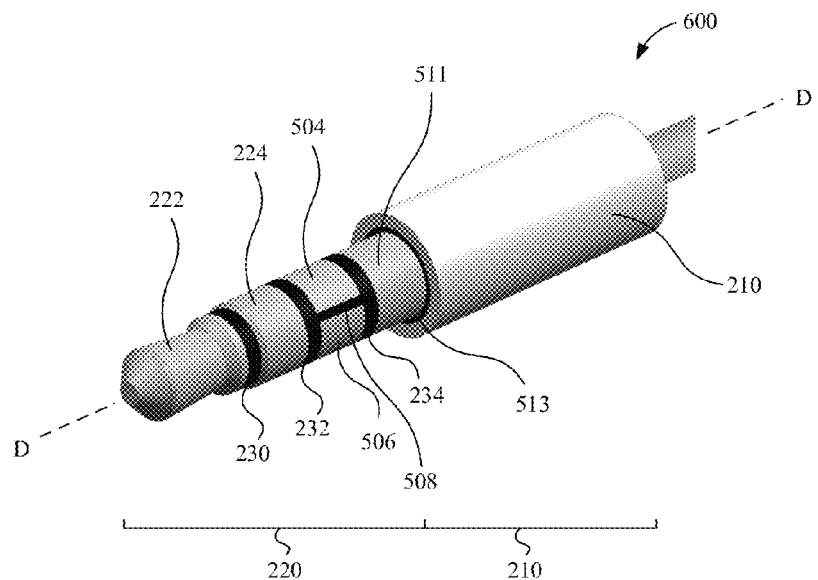
FIG. 8A illustrates an isometric view a split-ring plug connector according to an embodiment.
Figure 8B:
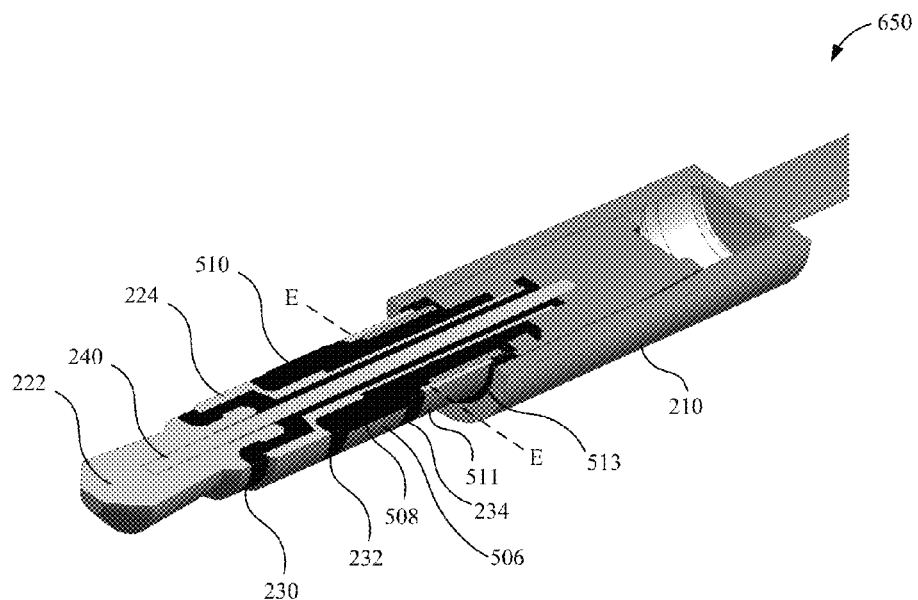
FIG. 8B illustrates a cross-sectional view of the split-ring plug connector of FIG. 8A through a plane extending along the length of and through the center of the plug connector.
Figure 8C:
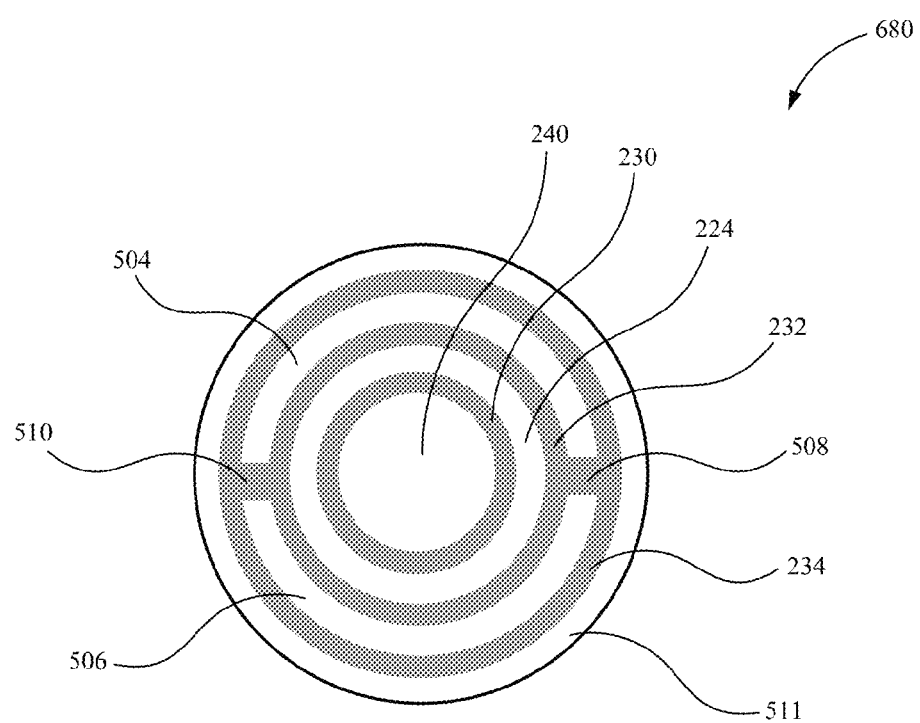
FIG. 8C illustrates a cross-sectional view of the split-ring plug connector of FIG. 8A through a plane extending perpendicular to the length of connector (i.e., through line E-E).

In some embodiments the conductive elements of each plug may be formed together with respective contacts of the plug as single elements and assembled together by insert molding, press-fitting, or the like. FIGS. 8A through 8C illustrate one example of such an embodiment.

Specifically, FIG. 8A illustrates an isometric view a split-ring plug connector 600 according to an embodiment, FIG. 8B illustrates a cross-sectional view 650 of the split-ring plug connector 600 of FIG. 8A through a plane extending along the length of and through the center of the plug connector 600 (i.e., through line D), and FIG. 8C illustrates a cross-sectional view 680 of the split-ring plug connector 600 of FIG. 8A through a plane extending perpendicular to the length of connector 600 (i.e., through line E-E).

Similar to the embodiment described with reference to FIGS. 5A and 5B, the split-ring plug connector 600 according to this embodiment includes a base 210, an insertion element 220, tip contact 222, ring contact 224, insulation ring 230, insulation ring 232, insulation ring 234, and split-ring contact 502 that includes a first contact 504 and a second contact 506 that are electrically isolated from one another by insulation elements 508 and 510. Split-ring plug connector 650 further includes a sleeve contact 511 arranged between the split-ring contact 502 and base 210 that, in this embodiment, is electrically insulated from base element 210 via insulation ring 513.

As illustrated in FIG. 8B and FIG. 8C, the split-ring plug connector 500 includes a number of single components that are assembled together. For example, conductive element 240 may be press-fit or crimped into tip 222. The resulting tip structure is assembled (e.g., via insert molding) with insulation ring 230 that not only traverses the circumference of the plug but also extends along the length of the plug surrounding (and in contact with) the conductive element 240 of tip 222. The ring contact 224 is then assembled onto the resulting structure and includes not only a conductive element that is exposed and traverses the circumference of the plug but also extends along the length of the plug surrounding (and in contact with) insulation ring 230. The split-ring contact 502 is then assembled onto the resulting structure. The split-ring contact includes insulation ring 232 that is arranged similar to insulation ring 230 but in this case extends along and electrically isolates the non-exposed portion of ring contact 224. The illustrated half of the split-ring contact 502 also includes second contact 506 that circumscribes only a portion of the periphery of the plug (e.g., the bottom half). The second contact 506 includes an exposed portion and an unexposed portion that extends along the length of the plug partially surrounding (e.g., surrounding the bottom half) and in contact with insulation ring 232. The first contact 508 is similarly arranged but on the opposite side of the plug. The split-ring contact 502 further includes insulation ring 234 that is arranged similar to insulation ring 232 but in this case extends along and electrically isolates the non-exposed portion of the split-ring contact 502. The sleeve contact 511 is then formed over the insulation ring 234 and, in this embodiment, electrically isolated from base 210 via insulation ring 513.

It should be recognized that the split-ring plug connectors described with reference to FIGS. 8A through 8C are merely examples and not intended to limit the scope of the embodiments described herein. For example, the split-ring contact 502 may include more than two contacts, may be arranged in a different position of the plug connector (e.g., in place of ring contact 224 and/or sleeve contact 511), and the plug may include or exclude sleeve contact 511. Other variations as described with reference to other figures, such as FIGS. 5A to 7B, may also be applied to the embodiments described with reference to FIGS. 8A through 8C. Thus, one of ordinary skill in the art would recognize and appreciate many variations, modifications, and alternatives.

The split-ring plug connector described herein may be used to facilitate a variety of data and/or audio communications. Due to the increased number of contacts over typical audio plugs, the split-ring plug connector may easily support multiple, even simultaneous, types of audio and data communication. Embodiments described herein focus on using such a plug connector for data communication. However, it should be recognized that embodiments are not so limited, as the same plug connector could similarly be used for audio communication and/or data communication.

Figure 9:
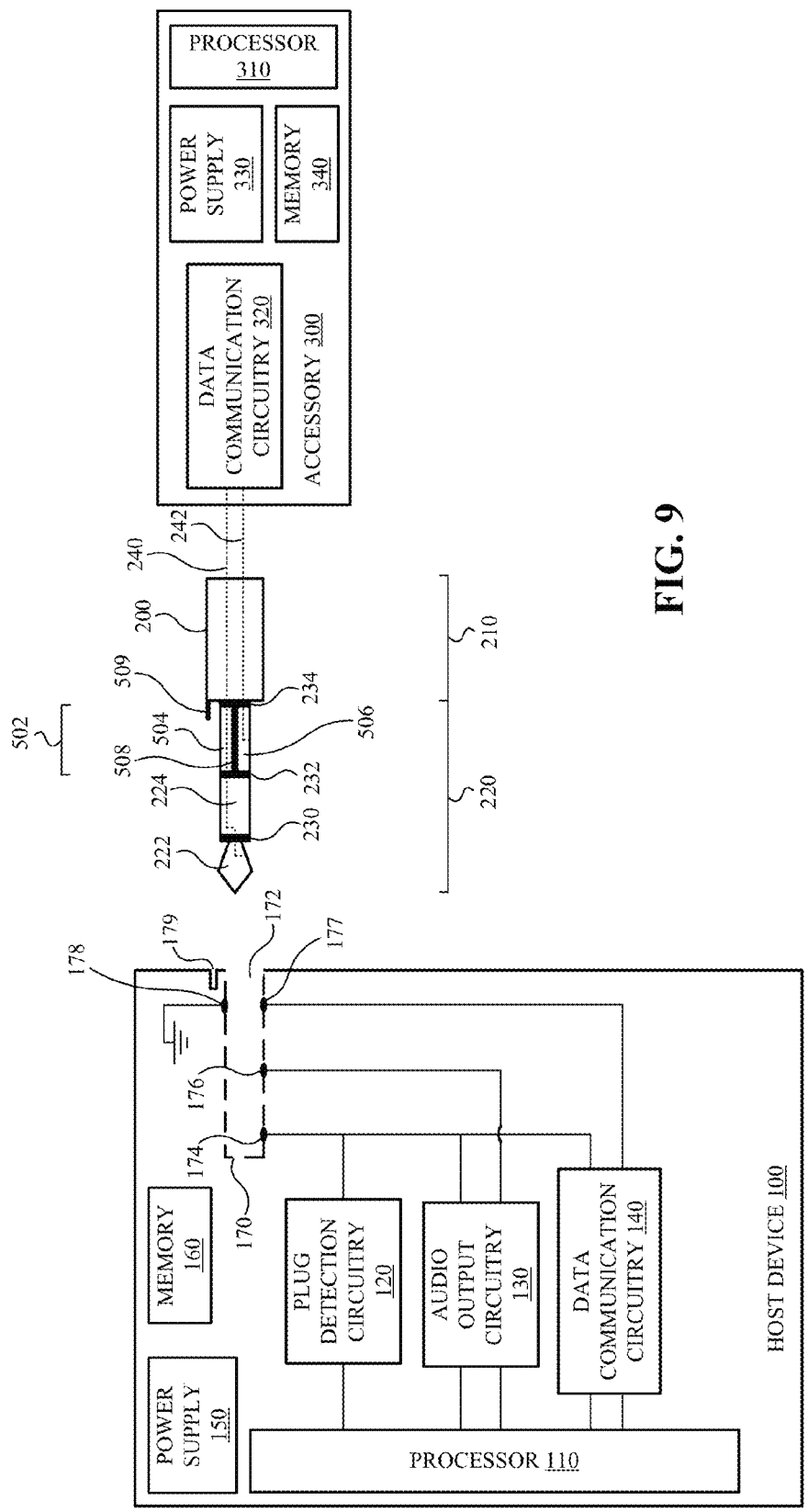
FIG. 9 illustrates a system for establishing data communication and/or audio communication over a split-ring audio plug according to an embodiment.

FIG. 9 illustrates a system for establishing data communication and/or audio communication over a split-ring audio plug according to an embodiment. The system includes a host device 100, an audio plug 200, and an accessory 300. The system according to this embodiment is similar to that described with reference to FIG. 5A, with various differences described herein.

Audio plug 200 according to this embodiment is similar to the audio plug described with reference to FIG. 1, but in this embodiment includes a split-ring contact 502. The split-ring contact 502 in this particular embodiment includes two contacts 504 and 506 electrically insulated from one another by insulation element 508, similar to the split-ring plug described with reference to FIG. 5A. Audio plug 200 also includes conductive elements 240 and 242, where conductive element 240 is electrically coupled to tip contact 222 and conductive element 242 is electrically coupled to contact 506 of split-ring contact 502.

However, other embodiments are not so limited. That is, any of the split-ring plugs described herein may be used in place of audio plug 200, where each split-ring plug may include a suitable number of conductive elements electrically coupled to its contacts so as to facilitate electrical connection with accessory 300. For example, with reference to FIG. 6A, conductive elements may be coupled to one or more of first contact 534, second contact 536, and third contact 538. In one embodiment, whether or not conductive elements are coupled to contacts of a split-ring contact may be based on whether the contacts are being used to communicate audio and/or data.

Audio plug 200 may also include a keying element 509 shaped to mate with a keying receptacle 179 of the host device 100. The keying element 509 operates to ensure that audio plug 200 mates with receptacle 170 in only one or a limited number of orientations so that the contacts forming split-ring contact 502 are oriented to contact the appropriate receptacle contacts. However, in other embodiments, techniques may be implemented such that a keying element 509 is not necessary. For example, the receptacle connector 170 may include redundant or otherwise strategically located contacts (so as to ensure at least one of the split-ring contacts is electrically connected to upon engagement of the plug connector).

Host device 100 according to this embodiment is similar to the host device described with reference to FIG. 1, but in this embodiment includes an additional receptacle contact 177. Receptacle contacts 177 and 178 are arranged in receptacle 170 so that upon mating with audio plug 200, receptacle contacts 177 and 178 electrically contact the contacts 506 and 504, respectively, of split-ring contact 502. Further, rather than receptacle contact 176 being coupled to both audio output circuitry 130 and data communication circuitry 140, receptacle contact 176 is coupled to only audio output circuitry 130 whereas receptacle contact 177 is coupled to data communication circuitry 140 as is receptacle contact 174. Accordingly, upon mating of audio plug 200 and receptacle 170, data communication may be facilitated over receptacle contacts 174 and 177 which are electrically coupled to tip ring 222 and contact 506 of split-ring contact 502, respectively.

Data communication circuitry 140 may be operable to send and receive data over the receptacle contacts of receptacle 170. One of the challenges in incorporating both data communication circuitry and audio output circuitry is possible noise interference between the transmission lines, especially where data output is performed over the same contacts as audio output. Such interference may be reduced by electrically isolating either the audio output circuitry 130 or data communication circuitry 140 when not in use, such as via switches 130B, 130C, 140H, and/or 140I. However, in some embodiments, in addition or alternatively to using such switches, the data output may be performed over one or more receptacle contacts that are not shared with audio output.

For example, in one particular embodiment, data communication circuitry 140 is operable to receive data over receptacle contact 174 (using, e.g., transistor 140B and its associated circuitry) and transmit data over receptacle contact 177 (using, e.g., transistor 140A and its associated circuitry). In such a case, the data transmission line is naturally isolated from receptacle contacts 174 and 176, and thus audio output circuitry 130, thereby reducing noise interference between the audio and data transmission lines. Accordingly, in this embodiment, data communication circuitry 320 of accessory 300 may be operable to transmit data over tip contact 222 and receive data over contact 506 of split-ring contact 502. Further, in some embodiments, noise may be reduced even further by forming one or more of the contacts of plug 200 using insulative rather than conductive material. For example, ring contact 224 may be formed as an insulator rather than a conductor. For another example, where a ground is not needed for data communication, first contact 504 of split-ring contact 502 may be formed as an insulator rather than a conductor.

The system described with reference to FIG. 9 in certain embodiments is a system for establishing data communication and/or audio communication over a split-ring audio plug according to an embodiment, and includes a host device 100, audio plug 200, and accessory 300. The specific example described with reference to FIG. 9 includes communicating data over particular receptacle contacts that mate with particular plug contacts. However, it should be recognized that embodiments are not so limited.

For example, a variety of audio plugs incorporating a variety of different types of split-ring contacts, e.g., the split-ring contacts described with reference to FIGS. 5A to 8C, may be used. Similarly, receptacle contacts may be arranged in receptacle 170 to electrically contact one or more of the contacts of audio plug 200 including one or more contacts of one or more split-ring contacts forming audio plug 200.

Audio output circuitry 130 and data communication circuitry 140 may similarly be configured to communicate audio and/or data over any of the contacts of receptacle 170.

For example, audio output circuitry 130 may be coupled to one or more receptacle contacts that electrically contact one or more contacts forming a split-ring contact. Data communication circuitry 140 may be coupled to more than one receptacle contact that electrically contacts more than one contact forming a split-ring contact, so that data is communicated exclusively over a split-ring contact. Both audio output circuitry 130 and data communication circuitry 140 may be coupled to receptacle contacts that electrically contact contacts forming a split-ring contact so that both audio and data is communicated over one or more split-ring contacts.

Similarly, data communication circuitry 320 may be coupled to plug contacts different than tip contact 222 and contact 506 of split ring 502 so that accessory 300 may communicate data and/or audio over any contacts of plug 200. For example, data communication circuitry 320 may be coupled to and communicate data via multiple contacts forming split-ring contact 502. Data communication circuitry 320, in some embodiments, may also or alternatively be operable to communicate audio signals over an audio plug 200 incorporating one or more split-ring contacts 502. For example, data communication circuitry 302 may be operable to receive audio signals over split-ring contact 504 and/or 506. For another example, data communication circuitry 302 may be operable to communicate audio over some contacts of audio plug 200 (e.g., tip contact 222 and ring contact 224) and communicate data over other contacts of audio plug 200 (e.g., contacts 504 and 506).

It will be appreciated by those of ordinary skill in the art that the system described with reference to FIG. 9 could operate equally well with more or, in some instances, fewer components than are illustrated in FIG. 9. Similarly, it will be appreciated by those of ordinary skill in the art that each of the host device 100, audio plug 200, and accessory 300 could operate equally well with more or, in some cases, fewer components, than those described with reference to FIG. 9. For example, the host device 100 and/or accessory 300 may also include I/O elements such as keyboards, mice, touchscreens, graphical displays, and other components of electronic devices known in the art. Further, it should be recognized that while audio connector 200 may be physically separate from accessory 300, in some embodiments audio connector 200 may be considered part of the accessory 300. Thus, the depictions in FIG. 9 should be taken as being illustrative in nature, and not limiting to the scope of the disclosure.

Some or all of the components described with reference to FIG. 9 may be used to perform a process for selectively establishing data communication or audio communication over an audio plug. As described with reference to FIG. 3, in some embodiments the host device may detect engagement of an audio plug with a receptacle connector of the host device and subsequently determine whether the audio plug is associated with an audio accessory or data communication accessory. Rather than communicating data using the same contacts that are typically used for audio communication, in embodiments incorporating a split-ring contact data (and/or audio) may be communicated over at least one of the contacts forming the spilt-ring contact. Such embodiments may incorporate steps for actively reducing interference by intelligently connecting and disconnecting audio output circuitry and data communication circuitry from the receptacle contacts, but in many embodiments such steps may be obviated due to the natural electrical isolation achievable with the increased number of plug contacts.

Figure 10:
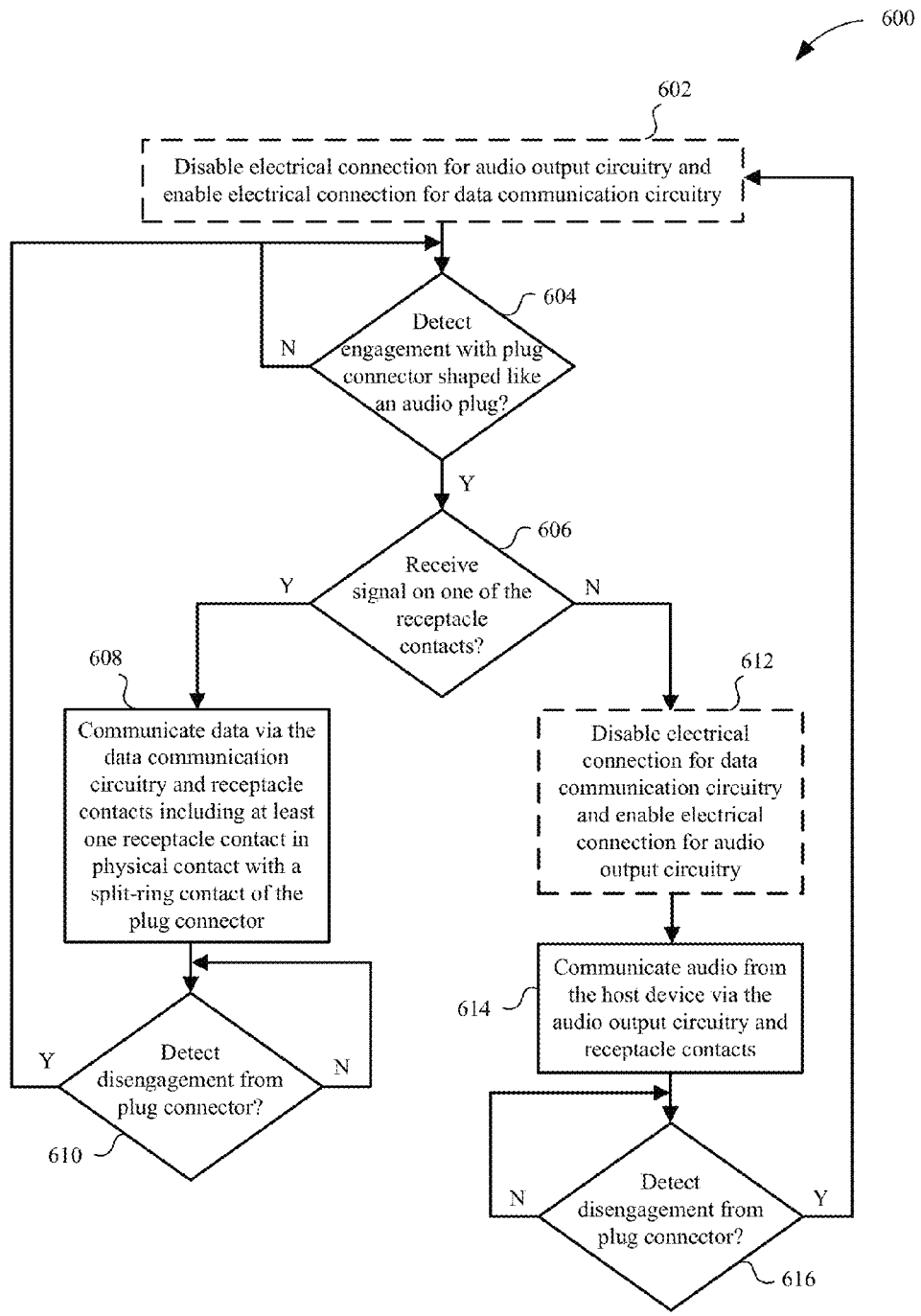
FIG. 10 illustrates a process of a host device for selectively establishing data communication or audio communication over an audio plug having a split-ring contact according to an embodiment.

FIG. 10 illustrates a process 600 of a host device for selectively establishing data communication or audio communication over an audio plug having a split-ring contact according to an embodiment. While described with reference to FIGS. 1 through 9, it should be recognized that embodiments are not so limited.

In operation 602, an electrical connection between audio output circuitry (e.g., audio output circuitry 130) and receptacle contacts operable to communicate audio signals from the audio output circuitry (e.g., receptacle contacts 174 and 176) is optionally disabled, and an electrical connection between data communication circuitry (e.g., data communication circuitry 140) and the receptacle contacts (e.g., receptacle contacts 174 and 177) is optionally enabled. This operation is similar to operations 402 and 404, except in this case may be optionally performed as the transmission components of data communication circuitry 140 and audio output circuitry 130 may be naturally isolated from one another. Notwithstanding such operations being indicated as optional in this embodiment, it should be recognized that the corresponding operations previously described with reference to FIG. 3 (i.e., operations 402 and 404) may similarly be optional.

In operation 604 it is determined whether engagement with a plug connector shaped like an audio plug is detected. This operation is similar to operation 406, and thus further description is omitted. If it is determined that a plug connector has not yet been fully engaged with the receptacle connector, then processing may return to operation 602 where host device 100 continues to monitor for such an engagement. Otherwise, processing may continue to operation 606.

In operation 606 it is determined whether a signal is received on one of the receptacle contacts. This operation is similar to operation 408. However, in this case, it may be determined whether a signal is received on any of the receptacle contacts including one or more contacts forming one or more split-ring contacts 502. When it is determined that a signal is received on one of the receptacle contacts, this is indicative of an accessory being coupled to a host device where the accessory desires to engage in data communication. Accordingly, processing may continue to operation 608.

In operation 608, data is communicated via the data communication circuitry (e.g., data communication circuitry 140) and receptacle contacts including at least one receptacle contact (e.g., receptacle contact 177) in physical contact with a split-ring contact (e.g., contact 506) of the plug connector. For example, data may be transmitted from host device 100 to accessory 300 via receptacle contact 177, and data may be received from accessory 300 by host device 100 via receptacle contact 174. In one particular embodiment, data communicated via the receptacle contacts may include handshake data suitable for establishing a particular data communication between host device 100 and accessory 300.

Processing may then continue to operation 610 where it is determined whether a disengagement from the plug connector is detected. Operation 610 is similar to operation 412, thus further description is omitted. When it is determined that the audio plug has not been removed from the receptacle connector, processing may return to operation 610 where the host device 100 continues to monitor for removal of the audio plug. Otherwise, processing may return to operation 604 where the host device 100 monitors for re-engagement with the audio plug.

Returning to operation 606, when it is determined that a signal is not received on one of the receptacle contacts that is operable to communicate audio signals from the audio output circuitry, this is indicative of an accessory being coupled to host device where the accessory desires to engage in audio communication. Accordingly, processing may continue to operation 612.

In operation 612 the electrical connection between data communication circuitry (e.g., data communication circuitry 140) and the receptacle contacts (e.g., receptacle contacts 174 and 177) is optionally disabled, and the electrical connection between audio output circuitry (e.g., audio output circuitry 130) and receptacle contacts operable to communicate audio signals from the audio output circuitry (e.g., receptacle contacts 174 and 176) is optionally enabled. This operation is similar to operations 414 and 416, except in this case may be optionally performed as the transmission components of data communication circuitry 140 and audio output circuitry 130 may be naturally isolated from one another. Notwithstanding such operations being indicated as optional in this embodiment, it should be recognized that the corresponding operations previously described with reference to FIG. 3 (i.e., operations 414 and 416) may similarly be optional.

In operation 614, audio is communicated from the host device to the accessory via audio output circuitry (e.g., audio output circuitry 130) and the receptacle contacts (e.g., receptacle contacts 174 and 176). This operation is similar to operation 418 and thus further description is omitted.

Processing may then continue to operation 616 where it is determined whether a disengagement from the plug connector is detected. This operation is similar to operation 420 and thus further description is omitted. When it is determined that the audio plug has not been removed from the receptacle connector, processing may return to operation 616 where the host device 100 continues to monitor for removal of the audio plug. Otherwise, processing may return to operation 602 where the host device 100 optionally disables the electrical connection between the audio output circuitry and receptacle contacts and re-enables the electrical connection between the data communication circuitry and receptacle contacts.

It should be appreciated that the specific operations illustrated in FIG. 10 provide a particular process of a host device for selectively establishing data communication or audio communication over an audio plug having a split-ring contact according to an embodiment. The various operations described with reference to FIG. 10 may be implemented at and performed by one or more of a variety of electronic devices or components described herein, such as host device 100. Other sequences of operations may also be performed according to alternative embodiments. For example, alternative embodiments of the present invention may perform the operations outlined above in a different order. Moreover, the individual operations illustrated in FIG. 10 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

In addition to processes for a host device determining whether to engage in audio or data communication with an accessory coupled to an audio having a split-ring contact being disclosed, some embodiments are also directed to processes for operating an accessory (e.g., a debug tool) to communicate data over contacts of a split-ring audio plug. In such embodiments, the accessory may first indicate to the host device that it is an accessory desiring to communicate data. In the embodiments described herein, the accessory does this by setting a voltage of one of its contacts (e.g., the tip contact or a contact forming a spit-ring contact of the audio plug) high or by sending some particular string of data over one or more of those contacts. If the accessory receives a response comprising some data communication, then the accessory may determine that the host device has properly identified the accessory as being a data communication accessory. However, if the accessory does not receive such a response, then the accessory may determine that the host has not yet recognized the accessory as being a data communication accessory and thus may not be in a state suitable for data communications. Accordingly, the accessory may again attempt to notify the host device that it is an accessory operable to engage in data communication and may continue to do so until it receives a suitable response from the host device.

Figure 11:
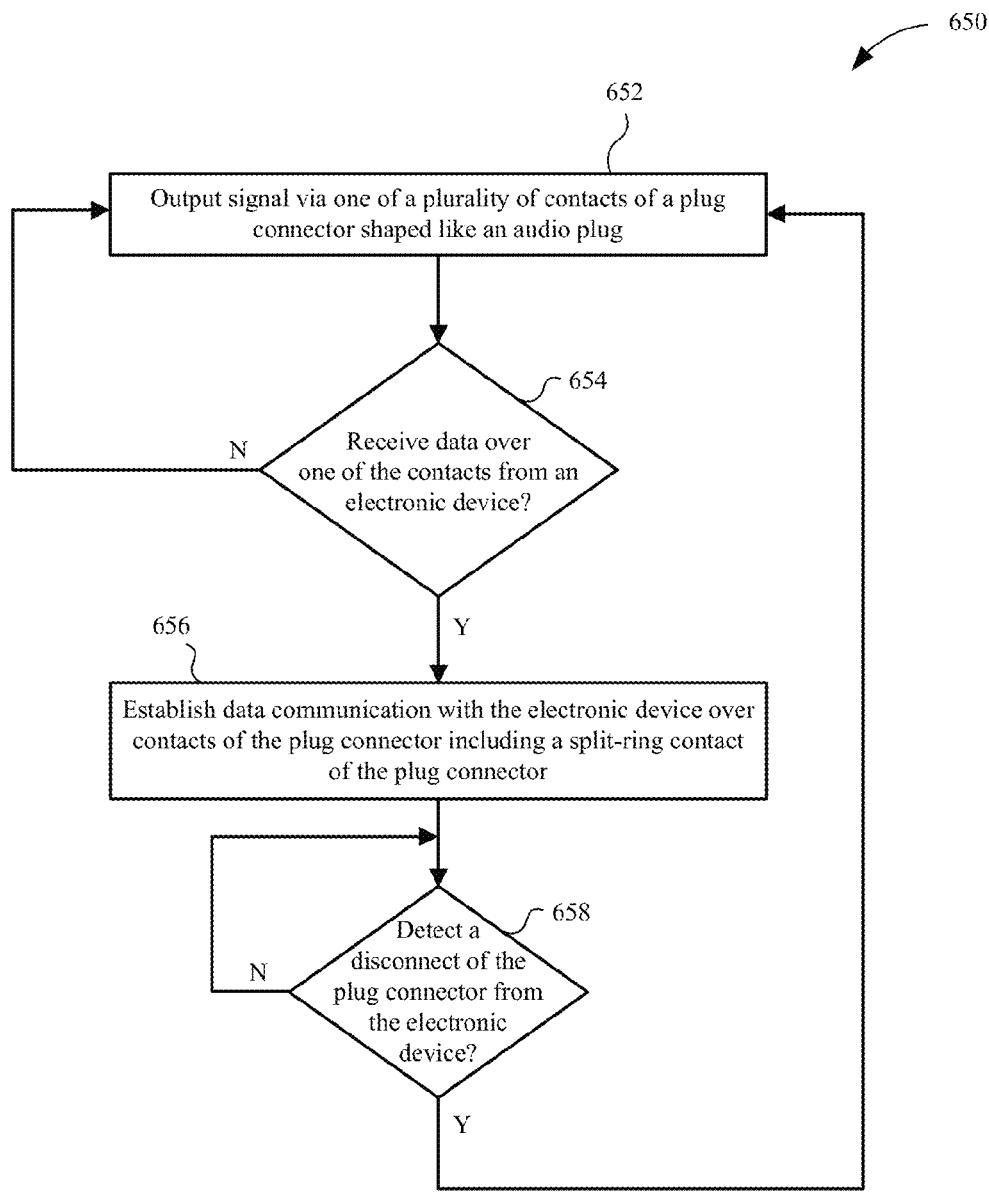
FIG. 11 illustrates a process of an accessory for selectively establishing data communication over an audio plug having a split-ring contact according to an embodiment.

Turning to the figures, FIG. 11 illustrates a process 650 of an accessory for selectively establishing data communication over an audio plug having a split-ring contact according to an embodiment. While described with reference to FIGS. 1 through 10, it should be recognized that embodiments are not so limited.

In operation 652 a signal is output via one of a plurality of contacts of a plug connector shaped like an audio plug and including at least one split-ring contact. For example, data communication circuitry 320 may output a voltage or other signal (such as a sequence of bits) to ring contact 224 of audio plug 200 via the conductive element 240, or one or more contacts forming a split-ring contact, such as to contact 506 via conductive element 242. Such signal may be generated and communicated by accessory 300 to indicate to host device 100 that accessory 300 desires to engage in data communication via the audio plug 200.

In operation 654 it is determined whether a response is received over one of the contact of the plug connector from the electronic device. For example, data communication circuitry 320 may monitor contact 506 of split-ring contact 502 to determine whether any voltage or other signal (e.g., a handshake signal) is received at the contact 506. If it is determined that a response is not received within a particular time period, then processing may return to operation 652 where the accessory again (or continues to) output a signal via one of a plurality of contacts of a plug connector shaped like an audio plug. Otherwise, processing may continue to operation 656.

In operation 656 data communication is established over contacts of the plug connector including a split-ring contact of the plug connector. For example, data communication circuitry 320 may communicate data to host device 100 via tip contact 222 and conductive element 240, where such data is received via receptacle contact 174 of host device 100. Data communication circuitry 320 may receive data from host device 100 via contact 506 of split-ring contact 502 and conductive element 242, where such data is communicated via receptacle contact 177 of host device 100.

In operation 658 accessory 300 may determine whether removal of the plug connector (e.g., audio plug 200) from the electronic device (e.g., receptacle 100 of host device 100) has been detected. This operation is similar to operation 458, thus further description is omitted. When it is determined that the audio plug has not been removed from the receptacle connector, processing may return to operation 658 where the accessory 300 continues to monitor for removal of the audio plug. Otherwise, processing may return to operation 652 where the accessory again outputs a signal via one of a plurality of contacts of a plug connector shaped like an audio plug.

It should be appreciated that the specific operations illustrated in FIG. 11 provide a particular process of an accessory for selectively establishing data communication over an audio plug according to an embodiment. The various operations described with reference to FIG. 11 may be implemented at and performed by one or more of a variety of electronic devices or components described herein, such as accessory 300. Other sequences of operations may also be performed according to alternative embodiments. For example, alternative embodiments of the present invention may perform the operations outlined above in a different order. Moreover, the individual operations illustrated in FIG. 11 may include multiple sub-operations that may be performed in various sequences as appropriate to the individual operations. Furthermore, additional operations may be added or existing operations removed depending on the particular applications. For example, in some embodiments the accessory may not output a signal via one of its contacts, but may output a signal wirelessly or using some other communication medium. Further, the accessory need not establish only data communications via a split-ring contact, but may also or alternatively establish audio communications over its contacts where one or more of the audio and data communications uses at least one contact forming the split-ring contact. One of ordinary skill in the art would recognize and appreciate many variations, modifications, and alternatives.

As described with reference to FIG. 9, in some embodiments the split-ring plug connector may not include a keying element 509. In such embodiments the split-ring plug connector may rotate (or, in the case of non-circular plugs, be arranged in different orientations) in the receptacle connector. It is possible that the plug connector may be oriented in the receptacle such that one or more insulation elements (e.g., insulation element 508) lands on (or otherwise contacts) one or more receptacle contacts (e.g., one or more of receptacle contacts 174, 176, and 178). In some embodiments, redundant receptacle contacts may be provided and arranged so as to reduce or eliminate this possibility.

FIG. 12 illustrates a cross-sectional view of a split-ring plug connector 700 similar to that described with reference to FIGS. 5A, 5B, and 8A through 8C, and includes a first contact 504 arranged opposite a second contact 506 whereby those contacts are electrically isolated from one another via insulation elements 508 and 510. In this particular example the insulation elements are arranged at 180 degrees with respect to one another and have a radial width W. To reduce the likelihood of receptacle contacts contacting the insulation elements 508 and/or 510 and consequently being non-functional, at least two receptacle contacts may be included in the receptacle whereby those two receptacle contacts are arranged within the receptacle such that in any given plug orientation at least one of the receptacle contacts is in contact with either the first contact 504 or the second contact 506.

FIG. 13A illustrates a cross-sectional view of a receptacle 170 having redundant receptacle contacts according to a first embodiment. In this embodiment, receptacle 170 includes a cavity 172 as previously discussed with reference to FIG. 1. Receptacle 170 also includes first receptacle contact 173a and second receptacle contact 173b. Receptacle contacts 173a and 173b are arranged at an angle less than 180 degrees from one another. The angle may depend on the maximum width W of insulation elements 508 and 510 and is at an angle less than 180 degrees such that, if the plug 700 and receptacle 170 were oriented such that the first receptacle contact 173a were in contact with insulation element 510, the second receptacle contact 173b would not be in contact with insulation element 508 but rather would be in contact with one of first contact 504 and second contact 506. In such a case, regardless of the orientation, at least one of contacts 504 and contacts 506 will be in electrical contact with at least one of receptacle contacts 173a and 173b.

FIG. 13B illustrates a cross-sectional view of a receptacle 170 having redundant receptacle contacts according to a second embodiment. In this embodiment, receptacle 170 includes a cavity 172 as previously discussed with reference to FIG. 1. Receptacle 170 also includes a first receptacle contact 173a, second receptacle contact 173b, and third receptacle contact 173c. Receptacle contacts 173a through 173c are arranged such that no two contacts are at an angle of 180 degrees from one another, similar to the two receptacle contacts described with reference to FIG. 13A. In this case, regardless of the orientation, each of contacts 504 and 506 will be in electrical contact with at least one of receptacle contacts 173a through 173c.

FIG. 13C illustrates a cross-sectional view of a receptacle 170 having redundant receptacle contacts according to a third embodiment. In this embodiment, receptacle 170 includes a cavity 172 as previously discussed with reference to FIG. 1. Receptacle 170 also includes a first receptacle contact 173a, second receptacle contact 173b, third receptacle contact 173c, and fourth receptacle contact 173d. Receptacle contacts 173a through 173d are arranged such that pairs of contacts are at an angle of 180 degrees from one another. In this case, regardless of the orientation, each of plug contacts 504 and 506 will be in electrical contact with at least one of receptacle contacts 173a through 173d.

It should be recognized that the split-ring plug connector described with reference to FIG. 12 and receptacle connectors described with reference to FIGS. 13A through 13C are merely examples and not intended to limit the scope of the embodiments described herein. For example, the receptacle contacts need not have the exact angular dimensions as illustrated in FIGS. 13A through 13C, but rather may have other angular dimensions such that at least one of the receptacle contacts is in electrical contact with at least one of the split-ring contacts regardless of the orientation of the plug connector with respect to the receptacle connector. Further, embodiments are not limited to split-ring plug connectors having only two contacts forming the split-ring, but may similarly include spilt-ring plug connectors having more than two contacts forming the split-ring.

Figure 14:
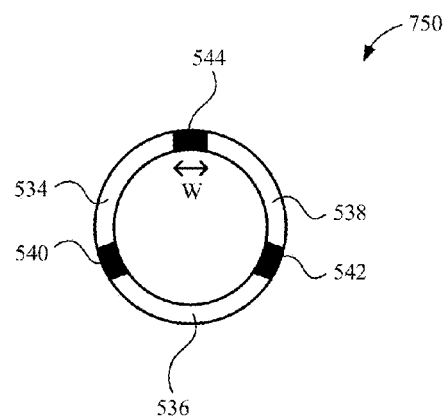
FIG. 14 illustrates a cross-sectional view of a split-ring plug connector similar to that described with reference to FIGS. 6A and 6B, and includes a first contact, a second contact, and a third contact, electrically insulated from one another via first insulation element, second insulation element, and third insulation element.

For example, FIG. 14 illustrates a cross-sectional view of a split-ring plug connector 750 similar to that described with reference to FIGS. 6A and 6B, and includes a first contact 534, a second contact 536, and a third contact 538, electrically insulated from one another via first insulation element 540, second insulation element 542, and third insulation element 544. In this particular example the insulation elements are arranged at 120 degrees with respect to one another and have a radial width W. To reduce the likelihood of receptacle contacts contacting the insulation elements 540, 542, and/or 544 and consequently being non-functional, at least two receptacle contacts may be included in the receptacle whereby those two receptacle contacts are arranged within the receptacle such that in any given plug orientation at least one of the receptacle contacts is in contact with either the first contact 534, the second contact 536, or the third contact 538.

Figure 15A:
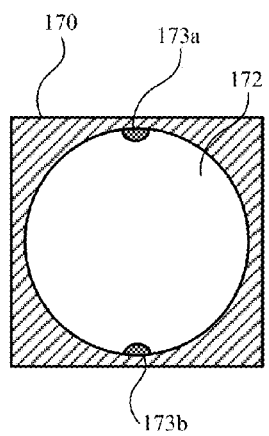
FIG. 15A illustrates a cross-sectional view of a receptacle having redundant receptacle contacts according to a fourth embodiment.

FIG. 15A illustrates a cross-sectional view of a receptacle 170 having redundant receptacle contacts according to a fourth embodiment. In this embodiment, receptacle 170 includes a cavity 172 as previously discussed with reference to FIG. 1. Receptacle 170 also includes first receptacle contact 173a and second receptacle contact 173b. Receptacle contacts 173a and 173b are arranged at an angle of 180 degrees from one another. The angle may depend on the maximum width W of insulation elements 540, 542, and 544, and is at an angle different than any of the angles between pairs of insulation elements 540, 542, and 544, such that if the plug 750 and receptacle 170 were oriented such that the first receptacle contact 173a were in contact with insulation element 544, the second receptacle contact 173b would not be in contact with either insulation element 540 or 542 but rather would be in contact with second contact 536. In such a case, regardless of the orientation, at least one of plug contacts 534, 536, and 538 will be in electrical contact with at least one of receptacle contacts 173a and 173b.

Figure 15B:
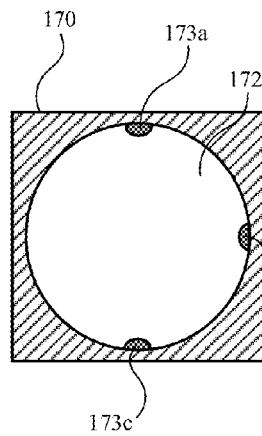
FIG. 15B illustrates a cross-sectional view of a receptacle having redundant receptacle contacts according to a fifth embodiment.

FIG. 15B illustrates a cross-sectional view of a receptacle 170 having redundant receptacle contacts according to a fifth embodiment. In this embodiment, receptacle 170 includes a cavity 172 as previously discussed with reference to FIG. 1. Receptacle 170 also includes a first receptacle contact 173a, second receptacle contact 173b, and third receptacle contact 173c. Receptacle contacts 173a and 173c are arranged at 180 degrees from one another, and are each arranged at 90 degrees from receptacle contact 173b. As a result, none of the receptacle contacts are arranged at the 120 degrees angles used by the insulation elements of the plug connector. In this case, regardless of the orientation, at least two of the plug contacts 534, 536, and 538 will be in electrical contact with at least two of receptacle contacts 173a through 173c.

Figure 15C:
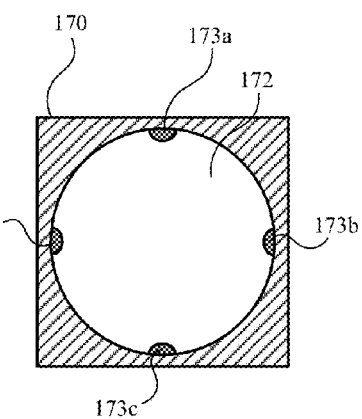
FIG. 15C illustrates a cross-sectional view of a receptacle having redundant receptacle contacts according to a sixth embodiment.

FIG. 15C illustrates a cross-sectional view of a receptacle 170 having redundant receptacle contacts according to a sixth embodiment. In this embodiment, receptacle 170 includes a cavity 172 as previously discussed with reference to FIG. 1. Receptacle 170 also includes a first receptacle contact 173a, second receptacle contact 173b, third receptacle contact 173c, and fourth receptacle contact 173d. Receptacle contacts 173a through 173d are arranged such that pairs of contacts are at an angle of 180 degrees from one another. In this case, regardless of the orientation, each of plug contacts 534, 536, and 538 will be in electrical contact with at least one of receptacle contacts 173a through 173d.

It should be recognized that the split-ring plug connector described with reference to FIG. 14 and receptacle connectors described with reference to FIGS. 15A through 15C are merely examples and not intended to limit the scope of the embodiments described herein. For example, the receptacle contacts need not have the exact angular dimensions as illustrated in FIGS. 15A through 15C, but rather may have other angular dimensions such that at least one of the receptacle contacts is in electrical contact with at least one of the split-ring contacts regardless of the orientation of the plug connector with respect to the receptacle connector. Further, embodiments are not limited to split-ring plug connectors having only two or three contacts forming the split-ring at equal angles, but may similarly include spilt-ring plug connectors having more than two or three contacts forming the split-ring at the same or different angles.

In some embodiments, particularly embodiments where the plug orientation may change with respect to the receptacle, and a particular plug contact may then electrically contact a different receptacle contact depending on the orientation, the host device 100 may include orientation detection circuitry operable to detect the orientation of the plug. Such circuitry may be implemented in existing circuitry already described (e.g., plug detection circuitry 120), processor 110, or in circuitry separate from that already described. The orientation detection circuitry may be coupled to one or more receptacle contacts such that it can communicate and/or receive signals via the receptacle contacts. The orientation detection circuitry may then determine the orientation of the plug connector based on signals communicated and/or received over different receptacle contacts. Some particular techniques for detecting orientation of a plug connector are described in U.S. patent application Ser. No. 13/232,989, filed Sep. 14, 2011, U.S. patent application Ser. No. 13/232,978, filed Sep. 14, 2011, and U.S. patent application Ser. No. 13/607,550, filed Sep. 7, 2012, all of which are hereby incorporated by reference in their entirety for all purposes.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A method for selectively communicating audio and data over a plug connector, comprising:
    detecting, at a receptacle connector of an electronic device including a plurality of receptacle contacts, insertion of a plug connector into the receptacle connector, the plug connector including an insertion element coupled to a base, the insertion element including a plurality of plug contacts arranged linearly between the base and a tip of the insertion element, the plurality of plug contacts including: a tip contact arranged at the tip of the insertion element, and a ring contact arranged between the tip contact and the base;
    determining whether a signal having a predetermined voltage is communicated to the electronic device via one or more of a first contact of the plurality of receptacle contacts and a second contact of the plurality of receptacle contacts, the first contact being arranged to electrically contact the tip contact of the plug connector upon insertion of the plug connector into the receptacle connector, the second contact being arranged to electrically contact the ring contact upon insertion of the plug connector into the receptacle connector; and
    selectively communicating one of an audio signal and a bi-directional handshake data signal via at least one of the first contact or the second contact based on whether it is determined that the signal having the predetermined voltage is communicated to the electronic device.

2. The method of claim 1, further comprising:
    communicating the audio signal via the first contact and the second contact when it is determined that the signal having the predetermined voltage is not communicated to the electronic device via one or more of the first contact and the second contact.

3. The method of claim 1, further comprising:
    prior to detecting insertion of a plug connector into the receptacle connector:
        disabling an electrical connection between audio output circuitry of the electronic device and the first contact and the second contact; and
        enabling an electrical connection between data communication circuitry of the electronic device and the first contact and the second contact.

4. The method of claim 3, further comprising:
    upon determining that the signal having the predetermined voltage was not communicated to the electronic device via one or more of the first contact and the second data:
        disabling the electrical connection between data communication circuitry of the electronic device and the first contact and the second contact;
        enabling the electrical connection between audio output circuitry of the electronic device and the first contact and the second contact; and
        communicating the audio signal via the first contact and the second contact.

5. The method of claim 4, further comprising:
    determining whether the plug connector has been removed from the receptacle connector; and
    upon determining that the plug connector has been removed from the receptacle connector:
        disabling an electrical connection between audio output circuitry of the electronic device and the first contact and the second contact; and
        enabling an electrical connection between data communication circuitry of the electronic device and the first contact and the second contact.

6. The method of claim 1, wherein determining whether a signal having a predetermined voltage is communicated to the electronic device via one or more of a first contact and a second contact includes determining whether there is a voltage differential between a voltage at a third contact of the receptacle contacts corresponding to an electrical ground and one of the first contact and the second contact.

7. An electronic device comprising:
    a receptacle connector capable of detecting an insertion of a plug connector into the receptacle connector and including a plurality of receptacle contacts, the plug connector including an insertion element coupled to a base, the insertion element including a plurality of plug contacts arranged linearly between the base and a tip of the insertion element, the plurality of plug contacts including: a tip contact arranged at the tip of the insertion element, and a ring contact arranged between the tip contact and the base;
    communication circuitry coupled to the receptacle connector and operable to:
        determine whether a signal having a predetermined voltage is communicated to the electronic device via one or more of a first contact of the plurality of receptacle contacts and a second contact of the plurality of receptacle contacts, the first contact being arranged to electrically contact the tip contact of the plug connector upon insertion of the plug connector into the receptacle connector, the second contact being arranged to electrically contact the ring contact upon insertion of the plug connector into the receptacle connector; and
        selectively communicate one of an audio signal and a bi-directional handshake data signal via at least one of the first contact or the second contact based on whether it is determined that the signal having the predetermined voltage is communicated to the electronic device.

8. The electronic device of claim 7, wherein the communication circuitry is operable to:
    communicate the audio signal via the first contact and the second contact when it is determined that the signal having the predetermined voltage is not communicated to the electronic device via one or more of the first contact and the second contact.

9. The electronic device of claim 7, wherein the communication circuitry is operable to:
    prior to detecting insertion of a plug connector into the receptacle connector:
        disable an electrical connection between audio output circuitry of the electronic device and the first contact and the second contact; and
        enable an electrical connection between data communication circuitry of the electronic device and the first contact and the second contact.

10. The electronic device of claim 9, wherein the communication circuitry is operable to:
    upon determining that the signal having the predetermined voltage was not communicated to the electronic device via one or more of the first contact and the second data:

disable the electrical connection between data communication circuitry of the electronic device and the first contact and the second contact;
enable the electrical connection between audio output circuitry of the electronic device and the first contact and the second contact; and
communicate the audio signal via the first contact and the second contact.

11. The electronic device of claim 10, wherein the communication circuitry is operable to determine whether the plug connector has been removed from the receptacle connector; and
upon determining that the plug connector has been removed from the receptacle connector (1) disable an electrical connection between audio output circuitry of the electronic device and the first contact and the second contact, and (2) enable an electrical connection between data communication circuitry of the electronic device and the first contact and the second contact.

12. The electronic device of claim 7, wherein the communication circuitry is operable to:
determine whether there is a voltage differential between a voltage at a third contact of the receptacle contacts corresponding to an electrical ground and one of the first contact and the second contact when determining whether a signal having a predetermined voltage is communicated to the electronic device via one or more of a first contact and a second contact.

* * * * *